United States Patent
Baus et al.

(10) Patent No.: US 7,981,313 B2
(45) Date of Patent: Jul. 19, 2011

(54) USE OF HYDROPHOBINS TO PREVENT ICE FROM FORMING ON SURFACES

(75) Inventors: Ulf Baus, Dossenheim (DE); Thorsten Montag, Dudenhofen (DE); Thomas Subkowski, Schriesheim (DE); Claus Bollschweiler, Heidelberg (DE); Ingo Grunwald, Bremen (DE); Klaus Rischka, Tostedt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 12/855,020

(22) Filed: Aug. 12, 2010

(65) Prior Publication Data

US 2011/0017943 A1    Jan. 27, 2011

Related U.S. Application Data

(63) Continuation-in-part of application No. PCT/EP2009/051292, filed on Feb. 5, 2009.

(30) Foreign Application Priority Data

Feb. 14, 2008 (EP) ..................................... 08101621

(51) Int. Cl.
*C09K 3/18* (2006.01)

(52) U.S. Cl. ............. 252/70; 106/13; 427/331; 427/352
(58) Field of Classification Search .................... 252/70; 106/13; 427/331, 352
See application file for complete search history.

(56) References Cited

U.S. PATENT DOCUMENTS

| 5,980,774 A * | 11/1999 | Sapienza .......................... 252/70 |
| 6,440,325 B1 | 8/2002 | Hartley et al. |
| 2003/0180704 A1 | 9/2003 | Brockbank et al. |
| 2005/0179000 A1 | 8/2005 | Sapienza et al. |
| 2008/0319168 A1 | 12/2008 | Subkowski et al. |
| 2009/0101167 A1 | 4/2009 | Boeckh et al. |
| 2009/0104663 A1 | 4/2009 | Subkowski et al. |

FOREIGN PATENT DOCUMENTS

| WO | WO-94/24413 A1 | 10/1994 |
| WO | WO-2006/082251 A2 | 8/2006 |
| WO | WO-2006/082253 A2 | 8/2006 |
| WO | WO-2007/014897 A1 | 2/2007 |

* cited by examiner

*Primary Examiner* — Anthony J Green
(74) *Attorney, Agent, or Firm* — Connolly Bove Lodge & Hutz LLP

(57) ABSTRACT

The use of hydrophobins for preventing the formation of ice on surfaces, especially for the prevention of ice formation on aircraft surfaces.

14 Claims, 3 Drawing Sheets

USE OF HYDROPHOBINS TO PREVENT ICE FROM FORMING ON SURFACES

RELATED APPLICATIONS

This application is a continuation-in-part of PCT/EP2009/051292, filed Feb. 5, 2009, which claims benefit of European application 08101621.4, filed Feb. 14, 2008, both of which are incorporated by reference herein in their entirety.

SUBMISSION OF SEQUENCE LISTING

The sequence listing associated with this application is filed in electronic format via EFS-Web and hereby incorporated by reference into the specification in its entirety. The name of the text file containing the Sequence Listing is Sequence_Listing__12810__01054_US.txt. The size of the text file is 76 KB, and the text file was created on Aug. 11, 2010.

BACKGROUND OF THE INVENTION

1. Field of the Invention

The present invention relates to the use of hydrophobins for preventing the formation of ice on surfaces, especially to the prevention of ice formation on hard surfaces.

2. Description of Related Art

Ice formation on surfaces, for example the surfaces of aircraft or motor vehicles, can lead to considerable safety problems, and, in the extreme case, an icebound aircraft or motor vehicle can no longer be operated. Ice formation on surfaces can also lead to undesired changes in the properties of the components in question. For example, in the case of a wind turbine, the aerodynamic properties of the wind turbine can be changed by ice formation. Various techniques are therefore known for eliminating ice layers or for preventing ice formation on surfaces.

Deicing in the actual sense is understood to mean the operation of actively freeing a surface of a snow or ice layer which is already present. This includes techniques such as the simple mechanical scraping of the ice from the surface with a suitable tool. Since this is of course not possible in the case of an aircraft during a flight, many aircraft are equipped with so-called "boots". These are rubber hoses which are placed on particularly endangered sites on the aircraft, for example the front edges of the wings, the aerofoils or the rudder, and which can be blown up if required in order to remove the ice in an explosive manner. Further details on this subject are disclosed, for example, by GB 1,166,526 or WO 02/42150. In addition, ice can be melted by waste heat from the engines which has been diverted through pipe systems, as disclosed, for example, by U.S. Pat. No. 6,267,328. However, this method is only possible in the case of relatively large aircraft and is additionally becoming increasingly inefficient, since the engines of modern aircraft are becoming ever more energy-efficient and produce less waste heat. In addition, thermoelectric heating films can be placed at particularly endangered sites (GB 787954).

It is also known to use chemicals for deicing. Typical icing fluids consist generally of water and particular proportions of ethylene glycol and/or propylene glycol. Reference is made by way of example to GB 2,050,398, WO 00/00568 or WO 07/104,996. The deicing fluid brings about a freezing point depression and thus frees the surface of the ice. In flight, deicing fluid can be sprayed out of holes in the aerofoils. U.S. Pat. No. 6,861,009 discloses compositions for deicing which comprise proteins. What is proposed is in particular the use of proteins which are ubiquitous in agriculture or cattle husbandry.

In addition to the active deicing of already iced surfaces, techniques have also been proposed with which ice formation on a surface is to be prevented from the start (anti-icing), such that subsequent deicing is no longer necessary.

For this purpose, for example, the surface can be provided with ice-preventing coatings. In aviation, it is possible for this purpose to use, for example, freezing point-depressing coatings, which consist of thickened mixtures of ethylene glycol and/or propylene glycol with water. The adhesive forces of these coatings are, however, so weak that they have flowed off the aerofoils of an aircraft within a few minutes up to a maximum of a few hours and thus do not offer any further protection from icing.

In addition, hydrophobic coatings for preventing ice formation are known. For example, JP-A 60-208373 discloses a composition for coating, which comprises methylsiloxane, acryloyl glycidyl ether, a thickener based on silicone, an epoxy resin, Teflon powder and fluorophosphoric esters. U.S. Pat. No. 6,702,953 discloses a coating produced in a sol-gel process, which consists of a hydrophobic matrix and a multicomponent freezing point depressant. The freezing point depressant consists of an alkoxide precursor which brings about slow emergence of a polyol to the surface of the coating.

Hydrophobins are small proteins of from about 100 to 150 amino acids, which occur in filamentous fungi, for example *Schizophyllum commune*. They generally have 8 cysteine units. Hydrophobins can be isolated from natural sources, but can also be obtained by recombinant methods, as disclosed, for example, by WO 2006/082251 or WO 2006/131564.

The prior art has proposed the use of hydrophobins for various applications.

WO 96/41882 proposes the use of hydrophobins as emulsifiers, thickeners, surfactants, for hydrophilizing hydrophobic surfaces, for improving the water stability of hydrophilic substrates, for preparing oil-in-water emulsions or water-in-oil emulsions. Additionally proposed are pharmaceutical applications such as the production of ointments or creams, and cosmetic applications such as skin protection or the production of shampoos or hair rinses. EP 1 252 516 discloses the coating of various substrates with a solution comprising hydrophobins at a temperature of from 30 to 80° C. WO 2006/082253 discloses the coating of surfaces with fusion hydrophobins at a pH of ≧4.

US 2006 0024417 discloses air-filled or foamed foods, for example ice cream or mousse, which comprise a hydrophobin. US 2006 0024419 discloses a frozen composition, for example foods, which comprise hydrophobins. It further discloses a process for inhibiting the growth of ice crystals in frozen products, in which a hydrophobin is added to the product to be frozen or during the freezing. In both cases, preference is given in each case to using class II hydrophobins. In contrast to class I hydrophobins, class II hydrophobins are readily soluble.

The use of hydrophobins for preventing ice formation on surfaces is to date still unknown.

BRIEF SUMMARY OF THE INVENTION

It was an object of the invention to provide a simple process for preventing ice formation on surfaces.

Accordingly, the use of hydrophobins for preventing the formation of ice on surfaces has been found, by treating the surface which has not been covered with ice with at least one hydrophobin.

DETAILED DESCRIPTION OF THE INVENTION

Figure 1:
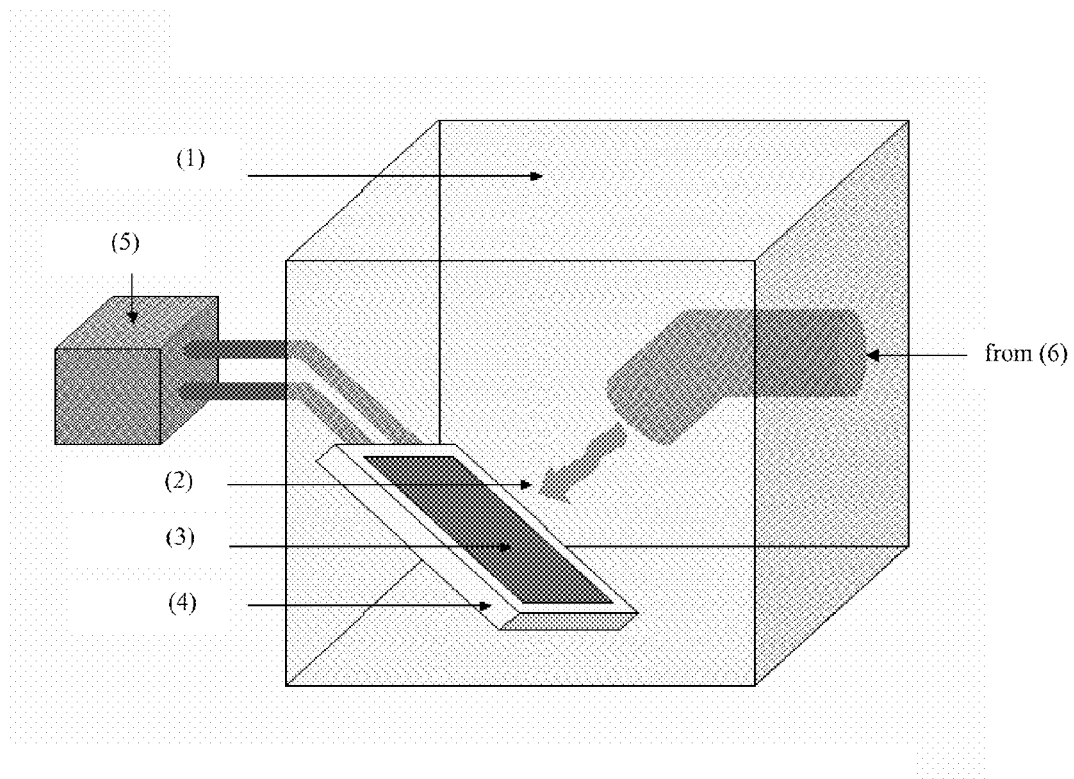
FIG. 1 shows the climate-controlled chamber.
Figure 2:
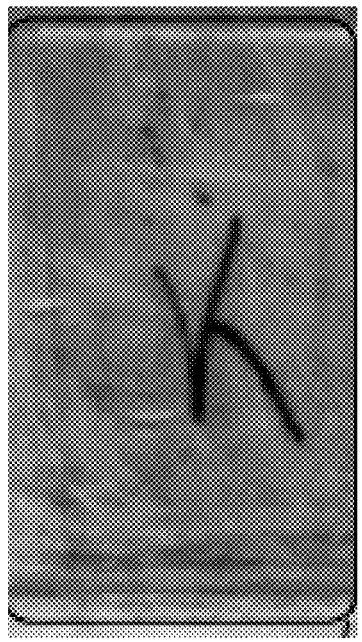
FIGS. 2 through 9 show the sample holders before and after the test.
Figure 3:
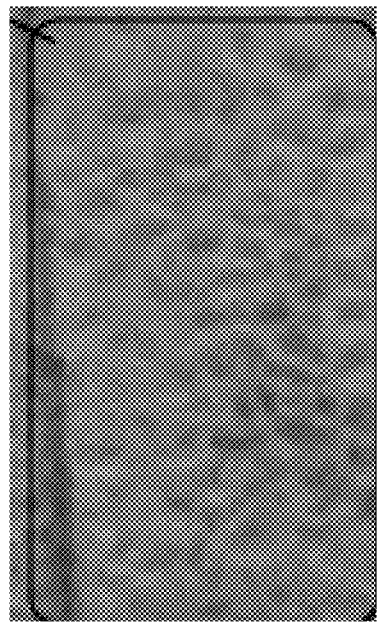
Figure 4:
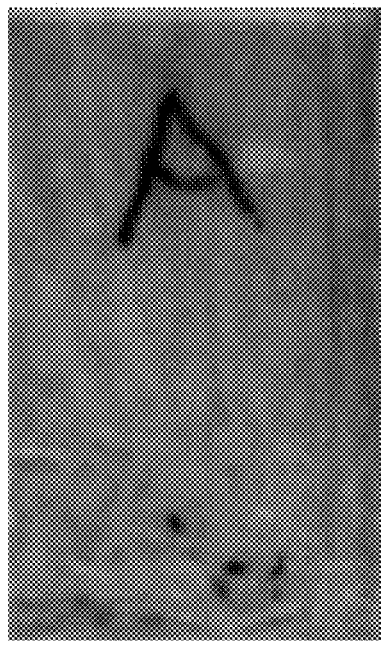
Figure 5:
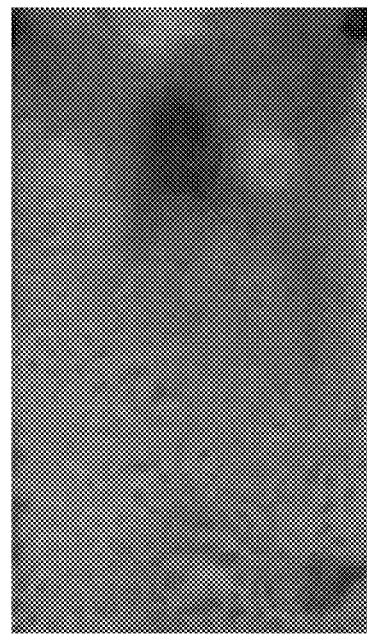
Figure 6:
Figure 7:
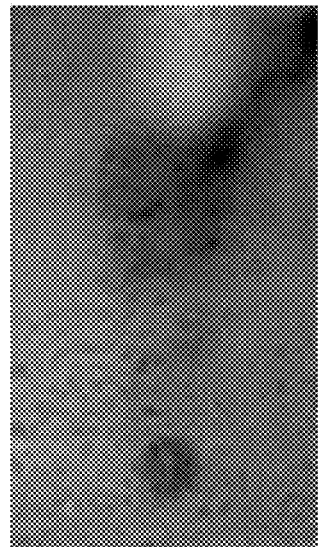
Figure 8:
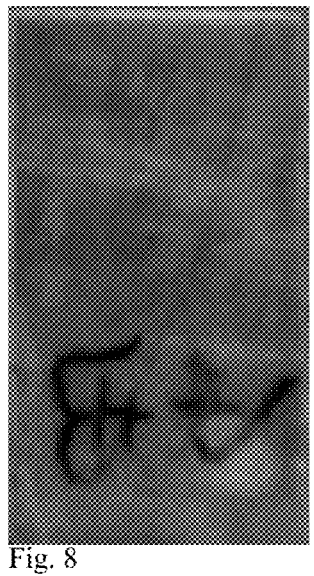
Figure 9:

Accordingly, the use of hydrophobins for preventing the formation of ice on surfaces has been found, by treating the surface which has not been covered with ice with at least one hydrophobin.

In a preferred embodiment, the surface is the surface of aircraft.

Regarding the invention, the following can be stated specifically:

In the context of the present invention, the term "hydrophobins" shall be understood hereinafter to mean polypeptides of the general structural formula (I)

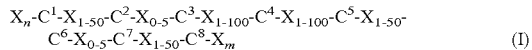
(I)

where X may be any of the 20 naturally occurring amino acids (Phe, Leu, Ser, Tyr, Cys, Trp, Pro, His, Gln, Arg, Ile, Met, Thr, Asn, Lys, Val, Ala, Asp, Glu, Gly). In the formula, the X residues may be the same or different in each case. The indices beside X are each the number of amino acids in the particular part-sequence X, C is cysteine, alanine, serine, glycine, methionine or threonine, where at least four of the residues designated with C are cysteine, and the indices n and m are each independently natural numbers between 0 and 500, preferably between 15 and 300.

The polypeptides of the formula (I) are also characterized by the property that, at room temperature, after coating a glass surface, they bring about an increase in the contact angle of a water droplet of at least 20°, preferably at least 25° and more preferably 30°, compared in each case with the contact angle of an equally large water droplet with the uncoated glass surface.

The amino acids designated with $C^1$ to $C^8$ are preferably cysteines. However, they may also be replaced by other amino acids with similar space filling, preferably by alanine, serine, threonine, methionine or glycine. However, at least four, preferably at least 5, more preferably at least 6 and in particular at least 7 of positions $C^1$ to $C^8$ should consist of cysteines. In the inventive proteins, cysteines may either be present in reduced form or form disulfide bridges with one another. Particular preference is given to the intramolecular formation of C—C bridges, especially those with at least one intramolecular disulfide bridge, preferably 2, more preferably 3 and most preferably 4 intramolecular disulfide bridges. In the case of the above-described exchange of cysteines for amino acids with similar space-filling, such C positions are advantageously exchanged in pairs which can form intramolecular disulfide bridges with one another.

If cysteines, serines, alanines, glycines, methionines or threonines are also used in the positions designated with X, the numbering of the individual C positions in the general formulae can change correspondingly.

Preference is given to using hydrophobins of the general formula (II)

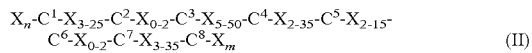
(II)

to perform the present invention, where X, C and the indices beside X and C are each as defined above, the indices n and m are each numbers between 0 and 350, preferably from 15 to 300, and the proteins additionally feature the above-illustrated change in contact angle, and, furthermore, at least 6 of the residues designated with C are cysteine. More preferably, all C residues are cysteine.

Particular preference is given to using hydrophobins of the general formula (III)

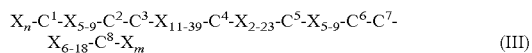
(III)

where X, C and the indices beside X are each as defined above, the indices n and m are each numbers between 0 and 200, and the proteins additionally feature the above-illustrated change in contact angle, and at least 6 of the residues designated with C are cysteine. More preferably, all C residues are cysteine.

The $X_n$ and $X_m$ residues may be peptide sequences which naturally are also joined to a hydrophobin. However, one residue or both residues may also be peptide sequences which are naturally not joined to a hydrophobin. This is also understood to mean those $X_n$ and/or $X_m$ residues in which a peptide sequence which occurs naturally in a hydrophobin is lengthened by a peptide sequence which does not occur naturally in a hydrophobin.

If $X_n$ and/or $X_m$ are peptide sequences which are not naturally bonded to hydrophobins, such sequences are generally at least 20, preferably at least 35 amino acids in length. They may, for example, be sequences of from 20 to 500, preferably from 30 to 400 and more preferably from 35 to 100 amino acids. Such a residue which is not joined naturally to a hydrophobin will also be referred to hereinafter as a fusion partner. This is intended to express that the proteins may consist of at least one hydrophobin moiety and a fusion partner moiety which do not occur together in this form in nature. Fusion hydrophobins composed of fusion partner and hydrophobin moiety are described, for example, in WO 2006/082251, WO 2006/082253 and WO 2006/131564, which are incorporated by reference herein in their entirety.

The fusion partner moiety may be selected from a multitude of proteins. It is possible for only one single fusion partner to be bonded to the hydrophobin moiety, or it is also possible for a plurality of fusion partners to be joined to one hydrophobin moiety, for example on the amino terminus ($X_n$) and on the carboxyl terminus ($X_m$) of the hydrophobin moiety. However, it is also possible, for example, for two fusion partners to be joined to one position ($X_n$ or $X_m$) of the inventive protein.

Particularly suitable fusion partners are proteins which naturally occur in microorganisms, especially in *E. coli* or *Bacillus subtilis*. Examples of such fusion partners are the sequences yaad (SEQ ID NO: 16 in WO 2006/082251 and herein), yaae (SEQ ID NO: 18 in WO 2006/082251 and herein), ubiquitin and thioredoxin. Also very suitable are fragments or derivatives of these sequences which comprise only some, for example from 70 to 99%, preferentially from 5 to 50% and more preferably from 10 to 40% of the sequences mentioned, or in which individual amino acids or nucleotides have been changed compared to the sequence mentioned, in which case the percentages are each based on the number of amino acids.

In a further preferred embodiment, the fusion hydrophobin, as well as the fusion partner mentioned as one of the $X_n$ or $X_m$ groups or as a terminal constituent of such a group, also has a so-called affinity domain (affinity tag/affinity tail). In a manner known in principle, this comprises anchor groups which can interact with particular complementary groups and can serve for easier workup and purification of the proteins. Examples of such affinity domains comprise $(His)_k$, $(Arg)_k$, $(Asp)_k$, $(Phe)_k$ or $(Cys)_k$ groups, where k is generally a natural number from 1 to 10. It may preferably be a $(His)_k$ group, where k is from 4 to 6. In this case, the $X_n$ and/or $X_m$ group may consist exclusively of such an affinity domain, or else an $X_n$ or $X_m$ residue which is or is not naturally bonded to a hydrophobin is extended by a terminal affinity domain.

The hydrophobins used in accordance with the invention may also be modified in their polypeptide sequence, for example by glycosylation, acetylation or else by chemical crosslinking, for example with glutaraldehyde.

One property of the hydrophobins or derivatives thereof used in accordance with the invention is the change in surface properties when the surfaces are coated with the proteins. The change in the surface properties can be determined experimentally, for example, by measuring the contact angle of a water droplet before and after the coating of the surface with the protein and determining the difference of the two measurements.

The performance of contact angle measurements is known in principle to those skilled in the art. The measurements are based on room temperature and water droplets of 5 □l and the use of glass plates as substrates. The exact experimental conditions for an example of a suitable method for measuring the contact angle are given in the experimental section. Under the conditions mentioned there, the fusion proteins used in accordance with the invention have the property of increasing the contact angle by at least 20°, preferably at least 25°, more preferably at least 30°, compared in each case with the contact angle of an equally large water droplet with the uncoated glass surface.

Particularly preferred hydrophobins for performing the present invention are the hydrophobins of the dewA, rodA, hypA, hypB, sc3, basf1, basf2 type. These hydrophobins including their sequences are disclosed herein and, for example, in WO 2006/82251. Unless stated otherwise, the sequences specified below are based on the sequences disclosed in WO 2006/82251. An overview table with the SEQ ID numbers can be found in WO 2006/82251 on page 20.

Especially suitable in accordance with the invention are the fusion proteins yaad-Xa-dewA-his (SEQ ID NO: 20), yaad-Xa-rodA-his (SEQ ID NO: 22) or yaad-Xa-basf1-his (SEQ ID NO: 24), with the polypeptide sequences specified in brackets and the nucleic acid sequences which code therefor, especially the sequences according to SEQ ID NO: 19, 21, 23. More preferably, yaad-Xa-dewA-his (SEQ ID NO: 20) can be used. Proteins which, proceeding from the polypeptide sequences shown in SEQ ID NO: 20, 22 or 24, arise through exchange, insertion or deletion of from at least one up to 10, preferably 5 amino acids, more preferably 5% of all amino acids, and which still have the biological property of the starting proteins to an extent of at least 50%, are also particularly preferred embodiments. A biological property of the proteins is understood here to mean the change in the contact angle by at least 20°, which has already been described.

Derivatives particularly suitable for performing the present invention are derivatives derived from yaad-Xa-dewA-his (SEQ ID NO: 20), yaad-Xa-rodA-his (SEQ ID NO: 22) or yaad-Xa-basf1-his (SEQ ID NO: 24) by truncating the yaad fusion partner. Instead of the complete yaad fusion partner (SEQ ID NO: 16) with 294 amino acids, it may be advantageous to use a truncated yaad residue. The truncated residue should, though, comprise at least 20, more preferably at least 35 amino acids. For example, a truncated residue having from 20 to 293, preferably from 25 to 250, more preferably from 35 to 150 and, for example, from 35 to 100 amino acids may be used. One example of such a protein is yaad40-Xa-dewA-his (SEQ ID NO: 26 in WO 2007/014897 and herein), which has a yaad residue truncated by 40 amino acids. WO 2007/014897 is incorporated by reference herein in its entirety.

A cleavage site between the hydrophobin and the fusion partner or the fusion partners can be utilized to split off the fusion partner and to release the pure hydrophobin in underivatized form (for example by BrCN cleavage at methionin, factor Xa cleavage, enterokinase cleavage, thrombin cleavage, TEV cleavage, etc.).

The hydrophobins used in accordance with the invention to modify open-cell foams can be prepared chemically by known methods of peptide synthesis, for example by Merrifield solid-phase synthesis.

Naturally occurring hydrophobins can be isolated from natural sources by means of suitable methods. Reference is made by way of example to Wösten et. al., Eur. J. Cell Bio. 63, 122-129 (1994) or WO 96/41882.

A recombinant production process for hydrophobins without fusion partners from *Talaromyces thermophilus* is described by US 2006/0040349.

Fusion proteins can be prepared preferably by genetic engineering methods, in which one nucleic acid sequence, especially DNA sequence, encoding the fusion partner and one encoding the hydrophobin moiety are combined in such a way that the desired protein is generated in a host organism as a result of gene expression of the combined nucleic acid sequence. Such a preparation process is disclosed, for example, by WO 2006/082251 or WO 2006/082253. The fusion partners make the production of the hydrophobins considerably easier. Fusion hydrophobins are produced in recombinant methods with significantly better yields than hydrophobins without fusion partners.

The fusion hydrophobins produced by the recombinant method from the host organisms can be worked up in a manner known in principle and be purified by means of known chromatographic methods.

In a preferred embodiment, the simplified workup and purification method disclosed in WO 2006/082253, pages 11/12, can be used. For this purpose, the fermented cells are first removed from the fermentation broth and digested, and the cell fragments are separated from the inclusion bodies. The latter can advantageously be effected by centrifugation. Finally, the inclusion bodies can be digested in a manner known in principle, for example by means of acids, bases and/or detergents, in order to release the fusion hydrophobins. The inclusion bodies comprising the fusion hydrophobins used in accordance with the invention can generally be dissolved completely even using 0.1 M NaOH within approx. 1 h.

The resulting solutions can—if appropriate after establishing the desired pH—be used without further purification to perform this invention. The fusion hydrophobins can, however, also be isolated from the solutions as a solid. Preferably, the isolation can be effected by means of spray granulation or spray drying, as described in WO 2006/082253, page 12. The products obtained after the simplified workup and purification method comprise, as well as residues of cell fragments, generally from approx. 80 to 90% by weight of proteins. Depending on the fusion construct and fermentation conditions, the amount of fusion hydrophobins is generally from 30 to 80% by weight based on the amount of all proteins.

The isolated products comprising fusion hydrophobins can be stored as solids and can be dissolved for use in the media desired in each case.

The fusion hydrophobins can be used as such or else, after detaching and removing the fusion partner, as "pure" hydrophobins for the performance of this invention. A cleavage is advantageously undertaken after the isolation of the inclusion bodies and their dissolution.

According to the invention, the hydrophobins are used to prevent the formation of ice on surfaces. To this end, the surfaces which have not been covered with ice are treated with hydrophobins.

The term "ice" shall be understood hereinafter, in a customary manner, to mean frozen water which can form at sufficiently low temperatures on the surface of bodies. In this context, the ice may be all kinds of ice, for example bulk ice, snow, frost or surface water which freezes over. In particular, it is ice which is formed on contact of cold surfaces with air of a particular atmospheric humidity.

The surfaces may be all kinds of surfaces which are to be protected from ice formation. They may especially be hard surfaces, for example surfaces composed of metals such as steel or aluminum, glass, plastics, wood, stone surfaces and concrete surfaces. In addition, they may be the surfaces of coating layers which are present on other materials.

Examples comprise the surfaces of air and space vehicles, motor vehicles, motorcycle helmets, panes of all kinds, for example window glass panes, auto windshields, aircraft windshields, steel structures, for example masts of overland lines, power lines, for example the power lines of overland lines, and in industrial plants or electrical plants.

In a preferred embodiment of the invention, the surfaces are those of air vehicles, especially aircraft, and the surfaces of cooled objects such as refrigerators and freezers, and pipes for cooled liquids or cooled gases.

However, the surfaces may also be soft surfaces, for example the surfaces of fruit and vegetables.

For the inventive use, preference is given to using a formulation which comprises at least water or an aqueous solvent mixture and at least one hydrophobin.

Suitable aqueous solvent mixtures comprise water and one or more water-miscible solvents. The selection of such components is restricted only to the extent that the hydrophobins and the other components must be sufficiently soluble in the mixture. In general, such mixtures comprise at least 50% by weight, preferably at least 65% by weight and more preferably at least 80% by weight of water. Examples of suitable water-miscible solvents comprise monoalcohols such as methanol, ethanol or propanol, higher alcohols such as ethylene glycol, propylene glycol or polyetherpolyols, and also ether alcohols such as butylglycol or methoxypropanol. The person skilled in the art makes a suitable selection among the water-miscible solvents according to the desired properties of the formulation. For example, it may be advisable for use at low temperatures to add ethylene glycol and/or propylene glycol to the water for freezing point depression.

The formulation used for treatment preferably has a pH of $\geq 4$, preferably $\geq 6$ and more preferably $\geq 7$. In particular, the pH is in the range from 4 to 11, preferably from 6 to 10, more preferably from 7 to 9.5 and most preferably from 7.5 to 9. For example, the pH may be from 7.5 to 8.5 or from 8.5 to 9.

To establish the pH, the formulation preferably comprises a suitable buffer. The person skilled in the art selects a suitable buffer according to the pH range intended for the coating. Examples include potassium dihydrogenphosphate buffer, tris(hydroxymethyl)aminomethane buffer (Tris buffer), borax buffer, sodium hydrogencarbonate buffer or sodium hydrogenphosphate buffer. Preference is given to Tris buffer.

The concentration of the buffer in the solution is determined by the person skilled in the art according to the desired properties of the formulation. The person skilled in the art will generally ensure a sufficient buffer capacity in order to achieve very constant coating conditions. A useful concentration has been found to be from 0.001 mol/l to 1 mol/l, preferably from 0.005 mol/l to 0.1 mol/l and more preferably from 0.01 mol/l to 0.05 mol/l.

In addition, the formulation comprises at least one hydrophobin. It will be appreciated that it is also possible to use mixtures of different hydrophobins. In a preferred embodiment of the invention, the hydrophobins used may be the abovementioned fusion hydrophobins. For example, it is possible to use yaad-Xa-dewA-his (SEQ ID NO: 20 from WO 2006/082251 and herein), and in particular products with a truncated yaad residue, for example yaad40-Xa-dewA-his. Advantageously, the products produced by the simplified purification process described above can be used.

The concentration of hydrophobins in the formulation is selected by the person skilled in the art according to the desired properties of the coating. With higher concentrations, it is generally possible to achieve more rapid coating. In general, a useful concentration has been found to be from 0.1 μg/ml to 1000 μg/ml, preferably from 1 μg/ml to 500 μg/ml, more preferably from 10 μg/ml to 250 μg/ml, even more preferably from 30 μg/ml to 200 μg/ml and, for example, from 50 to 100 μg/ml.

The formulation used may additionally optionally comprise further components or additives.

Examples of additional components comprise surfactants. Suitable surfactants are, for example, nonionic surfactants which comprise polyalkoxy groups, especially polyethylene oxide groups. Examples comprise polyoxyethylene stearates, alkoxylated phenols and the like. Further examples of suitable surfactants comprise polyethylene glycol(20) sorbitan monolaurate (TWEEN® 20), polyethylene glycol(20) sorbitan monopalmitate (TWEEN® 40), polyethylene glycol(20) sorbitan monostearate (TWEEN® 60), polyethylene glycol (20) sorbitan monooleate (TWEEN® 80), cyclohexylmethyl-β D-maltoside, cyclohexylethyl-β D-maltoside, cyclohexyl-n-hexyl-β D-maltoside, n-undecyl-β D-maltoside, n-octyl-β D-maltopyranoside, n-octyl-β D-glucopyranoside, n-octyl-α D-glucopyranoside, n-dodecanoylsucrose. Further surfactants are disclosed, for example, in WO 2005/68087, page 9 line 10 to page 10 line 2. The concentration of surfactants is generally from 0.001% by weight to 0.5% by weight, preferably from 0.01% by weight to 0.25% by weight and more preferably from 0.1% by weight to 0.2% by weight, based in each case on the amount of all components of the formulation.

In addition, metal ions, especially divalent metal ions, can also be added to the formulation. Metal ions can contribute to a more homogeneous coating. Examples of suitable divalent metal ions comprise, for example, alkaline earth metal ions such as $Ca^{2+}$ ions. Such metal ions can preferably be added in the form of salts soluble in the formulation, for example in the form of chlorides, nitrates or carbonate, acetate, citrate, gluconate, hydroxide, lactate, sulfate, succinate, tartrate. For example, it is possible to add $CaCl_2$ or $MgCl_2$. The solubility can optionally also be enhanced by suitable assistants, for example complexing agents. If present, the concentration of such metal ions is generally from 0.01 mmol/l to 10 mmol/l, preferably from 0.1 mmol/l to 5 mmol/l and more preferably from 0.5 mmol/l to 2 mmol/l.

The formulations can be obtained by mixing the above-described solutions from the workup with the desired additional components and diluting them to the desired concentration. It will be appreciated that the formulations can also be obtained by correspondingly dissolving isolated, solid hydrophobins.

For the inventive use, the surfaces to be protected from ice formation are treated with the formulation. The objects to be protected can, for example, be immersed into the formulation or sprayed with the formulation. The type of treatment is guided by the type of surface to be protected and is selected correspondingly by the person skilled in the art. To treat aircraft, it is possible, for example, to use the customary systems present at airports to spray aircraft with deicing agents. Automobiles can be treated, for example, by means of a suitable spray device in a carwash, especially in the course of or after the rinsing and before the drying. The hydrophobins can also be sprayed onto the auto windshield, for example, by means of the windshield washing system. For this purpose, the hydrophobin solution can also be supplied via a separate tank or vessel. Manual spraying of the surface is also possible.

In a preferred embodiment of the invention, the hydrophobin can also be applied as a liquid foam in order to prevent the spray solution from flowing off prematurely. To this end, the hydrophobin solution is first foamed by stirring in air mechanically or by supplying a suitable gas such as air or nitrogen, and then spraying onto the surface.

In general, a certain action time is required in order to deposit the hydrophobins on the surface. The person skilled in the art selects a suitable action time according to the desired result. Examples of typical actions times are from 0.1 to 12 h, without any intention that the invention be restricted thereto.

In general, the action time depends on the temperature and on the concentration of the hydrophobin in the solution. The higher the temperature and the higher the concentration in the course of the coating operation, the shorter the action time can be. The temperature in the course of the coating operation may be at room temperature, or else may be at elevated temperatures. For example, the temperatures may be 5, 10, 20, 30, 40, 50, 60, 70, 80, 90, 100, 110 or 120° C. The temperatures are preferably from 15 to 120° C., more preferably from 20 to 100° C., and, for example, from 40 to 100° C. or from 70 to 90° C. For this purpose, it is possible, for example, to adjust the temperature of a spray bath correspondingly, or to heat the solution before the spray application.

After the coating, the solvent is removed. The solvent can be removed by, for example, simple evaporation under air. The removal of the solvent can also be facilitated by increasing the temperature and/or with suitable gas streams and/or application of a vacuum. The evaporation can be facilitated by, for example, heating coated objects in a drying cabinet or blowing them with a heated gas stream. The methods can also be combined, for example by drying in a forced-air drying cabinet or a drying channel. In addition, the coating can also be heated to remove the solvent by means of radiation, especially IR radiation. For this purpose, it is possible to use all kinds of broadband IR radiators, for example NIR, MIR or NIR radiators. However, it is also possible, for example, to use IR lasers. Suitable radiation sources are commercially available in various radiation geometries. Whether a thermal application is possible depends, by its nature, on the kind of objects to be treated. Relatively small objects can be thermally treated in a relatively problem-free manner in a heated cabinet. The surfaces of larger objects can, for example, be heated with hot air blowers. To coat automobiles, for example, the blowers which are used to dry the automobile are used for thermal treatment.

The temperature and the drying time in the course of drying is fixed by the person skilled in the art. A useful drying temperature has been found to be from 10 to 130° C., preferably from 20 to 120° C., more preferably from 70 to 110° C., even more preferably from 75 to 105° C. and, for example, from 85 to 100° C. What is meant here is the temperature of the coating itself. The temperature in a dryer may of course also be higher. By its nature, the higher the drying temperature, the shorter the drying time.

The thermal treatment in the course of coating and the drying can advantageously be combined with one another. For example, one surface can first be treated with the formulation at room temperature and then dried and heat-treated at elevated temperatures.

The surfaces treated with the hydrophobins have a much greater resistance to icing than untreated surfaces. The hydrophobin layers adhere very well to the surfaces.

The examples which follow are intended to illustrate the invention:

Provision of the Hydrophobins

For the examples, a fusion hydrophobin with the complete fusion partner yaad was used (yaad-Xa-dewA-his; referred to hereinafter as hydrophobin A), as was a fusion hydrophobin with a fusion partner truncated to 40 amino acids yaad40-Xa-dewA-his (hydrophobin B). The preparation was effected according to the procedure described in WO 2006/082253.

Performance Testing: Characterization of the Fusion Hydrophobins by Changing Contact Angle of a Water Droplet on Glass Substrate:

Glass (Window Glass, Süddeutsche Glas, Mannheim)

For the tests, the spray-dried products comprising fusion hydrophobins were dissolved in water with addition of 50 mM sodium acetate pH 4 and 0.1% by weight of polyoxyethylene(20) sorbitan monolaurate (TWEEN® 20). Concentration of the product: 100 μg/mL in aqueous solution.

Procedure:

Incubation of glass plates overnight (temperature 80° C.), then wash coating in distilled water, then incubation 10 min/80° C./1% sodium dodecylsulfate (SDS) solution in dist. water, washing in dist. water.

The samples are dried under air and the contact angle (in degrees) of a drop of 5 μl of water at room temperature is determined.

The contact angle measurement was determined on a Dataphysics OCA 15+ contact angle system, software SCA 20.2.0. (November 2002). The measurement was effected according to the manufacturer's instructions.

Untreated glass gave a contact angle of from 15° to 30°±5°. Coating with the fusion hydrophobin yaad-Xa-dewA-$his_6$ gave rise to an increase in contact angle of more than 30°; a coating with the fusion hydrophobin yaad40-Xa-dewA-his likewise gave an increase in the contact angle of more than 30°.

Tests of Prevention of Ice Formation

Sample Analyzed:

A glass microscope slide was used (approx. 1.6×2.6 cm). The glass was cleaned with isopropanol and bidistilled water and coated with hydrophobin as described above. For coating, the hydrophobin was used in a concentration of 0.1% (w/v). The incubation was effected overnight at room temperature on a shaker (250 rpm; 3 cm Petri dish).

Test Setup

For the tests, a climate-controlled chamber according to FIG. 1 was used. The climate-controlled chamber (1) consists of a climate control system (6) for cooling and controlled moistening of the air (2), and a blower for control of the flow rate. The sample (3) is secured on a temperature-controllable sample holder (4). This sample holder is cooled by means of a cryostat (5). To visualize the ice formation processes, a camera is present in the chamber.

Test Procedure

Sample is placed on sample holder and blown with cold, moist air (2).

The sample holder is cooled. The moist and cold air flows onto the sample. When the air meets the sample, frost formation sets in. The frost formation can be documented by camera during the test.

Test Parameters:

Temperature of the sample holder: −4° C.
Air temperature: 1° C.
Relative air humidity: 88%
Air velocity: 9 m/s
Test duration: 4 hours
Results of the Test:

FIGS. 2 to 9 show the sample holders before and after the test.

| Diagrams before treatment in climate-controlled chamber | | Diagrams after treatment in climate-controlled chamber | |
|---|---|---|---|
| 2 | No hydrophobins | 3 | No hydrophobins |
| 4 | Hydrophobin A | 5 | Hydrophobin A |
| 6 | Hydrophobin B | 7 | Hydrophobin B |
| 8 | Hydrophobin A + B | 9 | Hydrophobin A + B |

Both hydrophobin A and hydrophobin B have a significant influence on frost formation compared to the control test without use of hydrophobin. This is evident both in the appearance of the frost layer and in the amount of the frosted area.

While an untreated comparative sample was completely frosted (the letter painted onto the microscope slide was completely covered), the icing of the microscope slide coated with hydrophobin was significantly reduced. The letters painted onto the microscope slide can still be seen clearly through the thin frost layer. In addition, the size of ice crystals on the slides coated with hydrophobins is significantly smaller than in the case of the untreated microscope slide.

The invention claimed is:

1. A method for preventing the formation of ice on a surface, the method comprising
    treating the surface, which is not covered with ice, with a hydrophobin formulation,
    wherein the formulation comprises a hydrophobin and a solvent, wherein the solvent is water or the solvent comprises a mixture, wherein at least 50% by weight of the mixture is water, then
    removing the solvent from the surface, then
    obtaining the surface having less susceptibility to icing than the surface that is not treated with the hydrophobin formulation.

2. The method of claim 1, wherein the hydrophobin comprises at least one polypeptide having the general structural formula (I)

$$X_n\text{-}C^1\text{-}X_{1\text{-}50}\text{-}C^2\text{-}X_{0\text{-}5}\text{-}C^3\text{-}X_{1\text{-}100}\text{-}C^4\text{-}X_{1\text{-}100}\text{-}C^5\text{-}X_{1\text{-}50}\text{-}C^6\text{-}X_{0\text{-}5}\text{-}C^7\text{-}X_{1\text{-}50}\text{-}C^8\text{-}X_m \quad (I)$$

wherein X represents a partial amino acid sequence, wherein each amino acid residue may be any of the 20 naturally occurring amino acids (Phe, Leu, Ser, Tyr, Cys, Trp, Pro, His, Gln, Arg, Ile, Met, Thr, Asn, Lys, Val, Ala, Asp, Glu, Gly); each amino acid residue of X may be the same or different from any other amino acid residue of X; the numerical subscript adjacent X indicates the number of amino acids in each partial amino acid sequence designated by X; C represents cysteine, alanine, serine, glycine, methionine or threonine, wherein at least four of the residues C are cysteine; and the subscripts n and m adjacent X independently represent natural numbers between 0 and 500 and indicate the number of amino acids in the partial amino acid sequence designated by X.

3. The method of claim 1, wherein the ice is formed on contacting the surface, which is at a temperature below the freezing point of water, with air having a particular atmospheric humidity.

4. The method of claim 2, wherein the mixture further comprises an alcohol.

5. The method of claim 4, wherein the alcohol is selected from the group consisting of ethylene glycol or propylene glycol.

6. The method of claim 1, wherein the hydrophobin is a fusion hydrophobin.

7. The method of claim 2, wherein the hydrophobin is a fusion hydrophobin.

8. The method of claim 1, wherein the hydrophobin is a fusion hydrophobin and the surface is a soft surface.

9. The method of claim 8, wherein the soft surface is the surface of a fruit or of a vegetable.

10. The method of claim 1, wherein the hydrophobin is a fusion hydrophobin and the surface is a hard surface.

11. The method of claim 10, wherein the hard surface is selected from the group consisting of surfaces of air vehicles, space vehicles, motor vehicles, helmets, steel structures, power lines, electrical equipment, and industrial equipment.

12. The method of claim 10, wherein the hard surface is a surface of aircraft.

13. The method of claim 10, wherein the hard surface is selected from the group consisting of surfaces of refrigerators, freezers, and pipes containing cooled liquids or gases.

14. The method of claim 1, wherein the hydrophobin formulation further comprises components selected from the group consisting of surfactants and metal ions.

* * * * *

SEQUENCE LISTING

```
<160> NUMBER OF SEQ ID NOS: 37

<210> SEQ ID NO 1
<211> LENGTH: 405
<212> TYPE: DNA
<213> ORGANISM: Aspergillus nidulans
<220> FEATURE:
<221> NAME/KEY: CDS
<222> LOCATION: (1)..(405)
<223> OTHER INFORMATION: basf-dewA: hydrophobin

<400> SEQUENCE: 1 atg cgc ttc atc gtc tct ctc ctc gcc ttc act gcc gcg gcc acc gcg      48
Met Arg Phe Ile Val Ser Leu Leu Ala Phe Thr Ala Ala Ala Thr Ala
1               5                   10                  15 acc gcc ctc ccg gcc tct gcc gca aag aac gcg aag ctg gcc acc tcg      96
Thr Ala Leu Pro Ala Ser Ala Ala Lys Asn Ala Lys Leu Ala Thr Ser
            20                  25                  30 gcg gcc ttc gcc aag cag gct gaa ggc acc acc tgc aat gtc ggc tcg     144
Ala Ala Phe Ala Lys Gln Ala Glu Gly Thr Thr Cys Asn Val Gly Ser
        35                  40                  45 atc gct tgc tgc aac tcc ccc gct gag acc aac aac gac agt ctg ttg     192
Ile Ala Cys Cys Asn Ser Pro Ala Glu Thr Asn Asn Asp Ser Leu Leu
    50                  55                  60 agc ggt ctg ctc ggt gct ggc ctt ctc aac ggg ctc tcg ggc aac act     240
Ser Gly Leu Leu Gly Ala Gly Leu Leu Asn Gly Leu Ser Gly Asn Thr
65                  70                  75                  80 ggc agc gcc tgc gcc aag gcg agc ttg att gac cag ctg ggt ctg ctc     288
Gly Ser Ala Cys Ala Lys Ala Ser Leu Ile Asp Gln Leu Gly Leu Leu
                85                  90                  95 gct ctc gtc gac cac act gag gaa ggc ccc gtc tgc aag aac atc gtc     336
Ala Leu Val Asp His Thr Glu Glu Gly Pro Val Cys Lys Asn Ile Val
            100                 105                 110 gct tgc tgc cct gag gga acc acc aac tgt gtt gcc gtc gac aac gct     384
Ala Cys Cys Pro Glu Gly Thr Thr Asn Cys Val Ala Val Asp Asn Ala
        115                 120                 125 ggc gct ggt acc aag gct gag                                          405
Gly Ala Gly Thr Lys Ala Glu
```

<210> SEQ ID NO 2
<211> LENGTH: 135
<212> TYPE: PRT
<213> ORGANISM: Aspergillus nidulans
<220> FEATURE:
<223> OTHER INFORMATION: basf-dewA hydrophobin

<400> SEQUENCE: 2

```
Met Arg Phe Ile Val Ser Leu Leu Ala Phe Thr Ala Ala Thr Ala
1               5                   10                  15

Thr Ala Leu Pro Ala Ser Ala Ala Lys Asn Ala Lys Leu Ala Thr Ser
            20                  25                  30

Ala Ala Phe Ala Lys Gln Ala Glu Gly Thr Thr Cys Asn Val Gly Ser
        35                  40                  45

Ile Ala Cys Cys Asn Ser Pro Ala Glu Thr Asn Asn Asp Ser Leu Leu
    50                  55                  60

Ser Gly Leu Leu Gly Ala Gly Leu Leu Asn Gly Leu Ser Gly Asn Thr
65                  70                  75                  80

Gly Ser Ala Cys Ala Lys Ala Ser Leu Ile Asp Gln Leu Gly Leu Leu
                85                  90                  95

Ala Leu Val Asp His Thr Glu Glu Gly Pro Val Cys Lys Asn Ile Val
            100                 105                 110

Ala Cys Cys Pro Glu Gly Thr Thr Asn Cys Val Ala Val Asp Asn Ala
        115                 120                 125

Gly Ala Gly Thr Lys Ala Glu
    130                 135
```

<210> SEQ ID NO 3
<211> LENGTH: 471
<212> TYPE: DNA
<213> ORGANISM: Aspergillus nidulans
<220> FEATURE:
<221> NAME/KEY: CDS
<222> LOCATION: (1)..(471)
<223> OTHER INFORMATION: basf-rodA hydrophobin

<400> SEQUENCE: 3

```
atg aag ttc tcc att gct gcc gct gtc gtt gct ttc gcc gcc tcc gtc      48
Met Lys Phe Ser Ile Ala Ala Ala Val Val Ala Phe Ala Ala Ser Val
1               5                   10                  15 gcg gcc ctc cct cct gcc cat gat tcc cag ttc gct ggc aat ggt gtt      96
Ala Ala Leu Pro Pro Ala His Asp Ser Gln Phe Ala Gly Asn Gly Val
            20                  25                  30 ggc aac aag ggc aac agc aac gtc aag ttc cct gtc ccc gaa aac gtg     144
Gly Asn Lys Gly Asn Ser Asn Val Lys Phe Pro Val Pro Glu Asn Val
        35                  40                  45 acc gtc aag cag gcc tcc gac aag tgc ggt gac cag gcc cag ctc tct     192
Thr Val Lys Gln Ala Ser Asp Lys Cys Gly Asp Gln Ala Gln Leu Ser
    50                  55                  60 tgc tgc aac aag gcc acg tac gcc ggt gac acc aca acc gtt gat gag     240
Cys Cys Asn Lys Ala Thr Tyr Ala Gly Asp Thr Thr Thr Val Asp Glu
65                  70                  75                  80 ggt ctt ctg tct ggt gcc ctc agc ggc ctc atc ggc gcc ggg tct ggt     288
Gly Leu Leu Ser Gly Ala Leu Ser Gly Leu Ile Gly Ala Gly Ser Gly
                85                  90                  95 gcc gaa ggt ctt ggt ctc ttc gat cag tgc tcc aag ctt gat gtt gct     336
Ala Glu Gly Leu Gly Leu Phe Asp Gln Cys Ser Lys Leu Asp Val Ala
            100                 105                 110 gtc ctc att ggc atc caa gat ctt gtc aac cag aag tgc aag caa aac     384
```

```
Val Leu Ile Gly Ile Gln Asp Leu Val Asn Gln Lys Cys Lys Gln Asn
        115                 120                 125 att gcc tgc tgc cag aac tcc ccc tcc agc gcg gat ggc aac ctt att        432
Ile Ala Cys Cys Gln Asn Ser Pro Ser Ser Ala Asp Gly Asn Leu Ile
        130                 135                 140 ggt gtc ggt ctc cct tgc gtt gcc ctt ggc tcc atc ctc                    471
Gly Val Gly Leu Pro Cys Val Ala Leu Gly Ser Ile Leu
145                 150                 155

<210> SEQ ID NO 4
<211> LENGTH: 157
<212> TYPE: PRT
<213> ORGANISM: Aspergillus nidulans
<220> FEATURE:
<223> OTHER INFORMATION: basf-rodA hydrophobin

<400> SEQUENCE: 4

Met Lys Phe Ser Ile Ala Ala Val Val Ala Phe Ala Ala Ser Val
1               5                   10                  15

Ala Ala Leu Pro Pro Ala His Asp Ser Gln Phe Ala Gly Asn Gly Val
            20                  25                  30

Gly Asn Lys Gly Asn Ser Asn Val Lys Phe Pro Val Pro Glu Asn Val
        35                  40                  45

Thr Val Lys Gln Ala Ser Asp Lys Cys Gly Asp Gln Ala Gln Leu Ser
    50                  55                  60

Cys Cys Asn Lys Ala Thr Tyr Ala Gly Asp Thr Thr Thr Val Asp Glu
65                  70                  75                  80

Gly Leu Leu Ser Gly Ala Leu Ser Gly Leu Ile Gly Ala Gly Ser Gly
                85                  90                  95

Ala Glu Gly Leu Gly Leu Phe Asp Gln Cys Ser Lys Leu Asp Val Ala
            100                 105                 110

Val Leu Ile Gly Ile Gln Asp Leu Val Asn Gln Lys Cys Lys Gln Asn
        115                 120                 125

Ile Ala Cys Cys Gln Asn Ser Pro Ser Ser Ala Asp Gly Asn Leu Ile
    130                 135                 140

Gly Val Gly Leu Pro Cys Val Ala Leu Gly Ser Ile Leu
145                 150                 155

<210> SEQ ID NO 5
<211> LENGTH: 336
<212> TYPE: DNA
<213> ORGANISM: Artificial Sequence
<220> FEATURE:
<221> NAME/KEY: CDS
<222> LOCATION: (1)..(336)
<223> OTHER INFORMATION: basf-hypA from chemically synthesized
      polynucleotide

<400> SEQUENCE: 5 atg atc tct cgc gtc ctt gtc gct gct ctc gtc gct ctc ccc gct ctt        48
Met Ile Ser Arg Val Leu Val Ala Ala Leu Val Ala Leu Pro Ala Leu
1               5                   10                  15 gtt act gca act cct gct ccc gga aag cct aaa gcc agc agt cag tgc        96
Val Thr Ala Thr Pro Ala Pro Gly Lys Pro Lys Ala Ser Ser Gln Cys
            20                  25                  30 gac gtc ggt gaa atc cat tgc tgt gac act cag cag act ccc gac cac       144
Asp Val Gly Glu Ile His Cys Cys Asp Thr Gln Gln Thr Pro Asp His
        35                  40                  45 acc agc gcc gcc gcg tct ggt ttg ctt ggt gtt ccc atc aac ctt ggt       192
Thr Ser Ala Ala Ala Ser Gly Leu Leu Gly Val Pro Ile Asn Leu Gly
    50                  55                  60
```

```
gct ttc ctc ggt ttc gac tgt acc ccc att tcc gtc ctt ggc gtc ggt      240
Ala Phe Leu Gly Phe Asp Cys Thr Pro Ile Ser Val Leu Gly Val Gly
65                  70                  75                  80 ggc aac aac tgt gct gct cag cct gtc tgc tgc aca gga aat caa ttc      288
Gly Asn Asn Cys Ala Ala Gln Pro Val Cys Cys Thr Gly Asn Gln Phe
                85                  90                  95 acc gca ttg att aac gct ctt gac tgc tct cct gtc aat gtc aac ctc      336
Thr Ala Leu Ile Asn Ala Leu Asp Cys Ser Pro Val Asn Val Asn Leu
            100                 105                 110

<210> SEQ ID NO 6
<211> LENGTH: 112
<212> TYPE: PRT
<213> ORGANISM: Artificial Sequence
<220> FEATURE:
<223> OTHER INFORMATION: basf-hypA from chemically synthesized
      polynucleotide

<400> SEQUENCE: 6

Met Ile Ser Arg Val Leu Val Ala Ala Leu Val Ala Leu Pro Ala Leu
1               5                   10                  15

Val Thr Ala Thr Pro Ala Pro Gly Lys Pro Lys Ala Ser Ser Gln Cys
            20                  25                  30

Asp Val Gly Glu Ile His Cys Cys Asp Thr Gln Gln Thr Pro Asp His
        35                  40                  45

Thr Ser Ala Ala Ala Ser Gly Leu Leu Gly Val Pro Ile Asn Leu Gly
    50                  55                  60

Ala Phe Leu Gly Phe Asp Cys Thr Pro Ile Ser Val Leu Gly Val Gly
65                  70                  75                  80

Gly Asn Asn Cys Ala Ala Gln Pro Val Cys Cys Thr Gly Asn Gln Phe
                85                  90                  95

Thr Ala Leu Ile Asn Ala Leu Asp Cys Ser Pro Val Asn Val Asn Leu
            100                 105                 110

<210> SEQ ID NO 7
<211> LENGTH: 357
<212> TYPE: DNA
<213> ORGANISM: Artificial Sequence
<220> FEATURE:
<221> NAME/KEY: CDS
<222> LOCATION: (1)..(357)
<223> OTHER INFORMATION: basf-hypB from chemically synthesized
      polynucleotide

<400> SEQUENCE: 7 atg gtc agc acg ttc atc act gtc gca aag acc ctt ctc gtc gcg ctc      48
Met Val Ser Thr Phe Ile Thr Val Ala Lys Thr Leu Leu Val Ala Leu
1               5                   10                  15 ctc ttc gtc aat atc aat atc gtc gtt ggt act gca act acc ggc aag      96
Leu Phe Val Asn Ile Asn Ile Val Val Gly Thr Ala Thr Thr Gly Lys
            20                  25                  30 cat tgt agc acc ggt cct atc gag tgt tgc aag cag gtc atg gat tct      144
His Cys Ser Thr Gly Pro Ile Glu Cys Cys Lys Gln Val Met Asp Ser
        35                  40                  45 aag agc cct cag gct acg gag ctt ctt acg aag aat ggc ctt ggc ctg      192
Lys Ser Pro Gln Ala Thr Glu Leu Leu Thr Lys Asn Gly Leu Gly Leu
    50                  55                  60 ggt gtc ctt gct ggc gtg aag ggt ctt gtt ggc gcg aat tgc agc cct      240
Gly Val Leu Ala Gly Val Lys Gly Leu Val Gly Ala Asn Cys Ser Pro
65                  70                  75                  80 atc acg gca att ggt att ggc tcc ggc agc caa tgc tct ggc cag acc      288
Ile Thr Ala Ile Gly Ile Gly Ser Gly Ser Gln Cys Ser Gly Gln Thr
                85                  90                  95
```

```
gtt tgc tgc cag aat aat aat ttc aac ggt gtt gtc gct att ggt tgc    336
Val Cys Cys Gln Asn Asn Asn Phe Asn Gly Val Val Ala Ile Gly Cys
                100                 105                 110 act ccc att aat gcc aat gtg                                        357
Thr Pro Ile Asn Ala Asn Val
        115
```

<210> SEQ ID NO 8
<211> LENGTH: 119
<212> TYPE: PRT
<213> ORGANISM: Artificial Sequence
<220> FEATURE:
<223> OTHER INFORMATION: basf-hypB from chemically synthesized
      polynucleotide

<400> SEQUENCE: 8

```
Met Val Ser Thr Phe Ile Thr Val Ala Lys Thr Leu Leu Val Ala Leu
1               5                   10                  15

Leu Phe Val Asn Ile Asn Ile Val Val Gly Thr Ala Thr Thr Gly Lys
                20                  25                  30

His Cys Ser Thr Gly Pro Ile Glu Cys Cys Lys Gln Val Met Asp Ser
            35                  40                  45

Lys Ser Pro Gln Ala Thr Glu Leu Leu Thr Lys Asn Gly Leu Gly Leu
        50                  55                  60

Gly Val Leu Ala Gly Val Lys Gly Leu Val Ala Asn Cys Ser Pro
65                  70                  75                  80

Ile Thr Ala Ile Gly Ile Gly Ser Gly Ser Gln Cys Ser Gly Gln Thr
                85                  90                  95

Val Cys Cys Gln Asn Asn Asn Phe Asn Gly Val Val Ala Ile Gly Cys
                100                 105                 110

Thr Pro Ile Asn Ala Asn Val
        115
```

<210> SEQ ID NO 9
<211> LENGTH: 408
<212> TYPE: DNA
<213> ORGANISM: Schyzophyllum commune
<220> FEATURE:
<221> NAME/KEY: CDS
<222> LOCATION: (1)..(408)
<223> OTHER INFORMATION: basf-sc3 hydrophobin, cDNA template

<400> SEQUENCE: 9

```
atg ttc gcc cgt ctc ccc gtc gtg ttc ctc tac gcc ttc gtc gcg ttc    48
Met Phe Ala Arg Leu Pro Val Val Phe Leu Tyr Ala Phe Val Ala Phe
1               5                   10                  15 ggc gcc ctc gtc gct gcc ctc cca ggt ggc cac ccg ggc acg acc acg    96
Gly Ala Leu Val Ala Ala Leu Pro Gly Gly His Pro Gly Thr Thr Thr
                20                  25                  30 ccg ccg gtt acg acg acg gtg acg gtg acc acg ccg ccc tcg acg acg    144
Pro Pro Val Thr Thr Thr Val Thr Val Thr Thr Pro Pro Ser Thr Thr
            35                  40                  45 acc atc gcc gcc ggt ggc acg tgt act acg ggg tcg ctc tct tgc tgc    192
Thr Ile Ala Ala Gly Gly Thr Cys Thr Thr Gly Ser Leu Ser Cys Cys
        50                  55                  60 aac cag gtt caa tcg gcg agc agc agc cct gtt acc gcc ctc ctc ggc    240
Asn Gln Val Gln Ser Ala Ser Ser Ser Pro Val Thr Ala Leu Leu Gly
65                  70                  75                  80 ctg ctc ggc att gtc ctc agc gac ctc aac gtt ctc gtt ggc atc agc    288
Leu Leu Gly Ile Val Leu Ser Asp Leu Asn Val Leu Val Gly Ile Ser
                85                  90                  95
```

```
tgc tct ccc ctc act gtc atc ggt gtc gga ggc agc ggc tgt tcg gcg      336
Cys Ser Pro Leu Thr Val Ile Gly Val Gly Gly Ser Gly Cys Ser Ala
        100                 105                 110 cag acc gtc tgc tgc gaa aac acc caa ttc aac ggg ctg atc aac atc      384
Gln Thr Val Cys Cys Glu Asn Thr Gln Phe Asn Gly Leu Ile Asn Ile
            115                 120                 125 ggt tgc acc ccc atc aac atc ctc                                      408
Gly Cys Thr Pro Ile Asn Ile Leu
        130                 135

<210> SEQ ID NO 10
<211> LENGTH: 136
<212> TYPE: PRT
<213> ORGANISM: Schyzophyllum commune
<220> FEATURE:
<223> OTHER INFORMATION: basf-sc3 hydrophobin, cDNA template

<400> SEQUENCE: 10

Met Phe Ala Arg Leu Pro Val Val Phe Leu Tyr Ala Phe Val Ala Phe
1               5                   10                  15

Gly Ala Leu Val Ala Ala Leu Pro Gly Gly His Pro Gly Thr Thr Thr
            20                  25                  30

Pro Pro Val Thr Thr Val Thr Val Thr Thr Pro Pro Ser Thr Thr Thr
        35                  40                  45

Thr Ile Ala Ala Gly Gly Thr Cys Thr Thr Gly Ser Leu Ser Cys Cys
    50                  55                  60

Asn Gln Val Gln Ser Ala Ser Ser Ser Pro Val Thr Ala Leu Leu Gly
65                  70                  75                  80

Leu Leu Gly Ile Val Leu Ser Asp Leu Asn Val Leu Val Gly Ile Ser
                85                  90                  95

Cys Ser Pro Leu Thr Val Ile Gly Val Gly Gly Ser Gly Cys Ser Ala
            100                 105                 110

Gln Thr Val Cys Cys Glu Asn Thr Gln Phe Asn Gly Leu Ile Asn Ile
        115                 120                 125

Gly Cys Thr Pro Ile Asn Ile Leu
    130                 135

<210> SEQ ID NO 11
<211> LENGTH: 483
<212> TYPE: DNA
<213> ORGANISM: Artificial Sequence
<220> FEATURE:
<221> NAME/KEY: CDS
<222> LOCATION: (1)..(483)
<223> OTHER INFORMATION: basf-BASF1 from chemically synthesized
      polynucleotide

<400> SEQUENCE: 11 atg aag ttc tcc gtc tcc gcc gcc gtc ctc gcc ttc gcc gcc tcc gtc       48
Met Lys Phe Ser Val Ser Ala Ala Val Leu Ala Phe Ala Ala Ser Val
1               5                   10                  15 gcc gcc ctc cct cag cac gac tcc gcc gcc ggc aac ggc aac ggc gtc       96
Ala Ala Leu Pro Gln His Asp Ser Ala Ala Gly Asn Gly Asn Gly Val
            20                  25                  30 ggc aac aag ttc cct gtc cct gac gac gtc acc gtc aag cag gcc acc      144
Gly Asn Lys Phe Pro Val Pro Asp Asp Val Thr Val Lys Gln Ala Thr
        35                  40                  45 gac aag tgc ggc gac cag gcc cag ctc tcc tgc tgc aac aag gcc acc      192
Asp Lys Cys Gly Asp Gln Ala Gln Leu Ser Cys Cys Asn Lys Ala Thr
    50                  55                  60 tac gcc ggc gac gtc ctc acc gac atc gac gag ggc atc ctc gcc ggc      240
Tyr Ala Gly Asp Val Leu Thr Asp Ile Asp Glu Gly Ile Leu Ala Gly
```

```
                    65                  70                  75                  80
ctc ctc aag aac ctc atc ggc ggc ggc tcc ggc tcc gag ggc ctc ggc          288
Leu Leu Lys Asn Leu Ile Gly Gly Gly Ser Gly Ser Glu Gly Leu Gly
                85                  90                  95 ctc ttc gac cag tgc gtc aag ctc gac ctc cag atc tcc gtc atc ggc          336
Leu Phe Asp Gln Cys Val Lys Leu Asp Leu Gln Ile Ser Val Ile Gly
            100                 105                 110 atc cct atc cag gac ctc ctc aac cag gtc aac aag cag tgc aag cag          384
Ile Pro Ile Gln Asp Leu Leu Asn Gln Val Asn Lys Gln Cys Lys Gln
        115                 120                 125 aac atc gcc tgc tgc cag aac tcc cct tcc gac gcc acc ggc tcc ctc          432
Asn Ile Ala Cys Cys Gln Asn Ser Pro Ser Asp Ala Thr Gly Ser Leu
    130                 135                 140 gtc aac ctc ggc ctc ggc aac cct tgc atc cct gtc tcc ctc ctc cat          480
Val Asn Leu Gly Leu Gly Asn Pro Cys Ile Pro Val Ser Leu Leu His
145                 150                 155                 160 atg                                                                       483
Met
```

<210> SEQ ID NO 12
<211> LENGTH: 161
<212> TYPE: PRT
<213> ORGANISM: Artificial Sequence
<220> FEATURE:
<223> OTHER INFORMATION: basf-BASF1 from chemically synthesized
      polynucleotide

<400> SEQUENCE: 12

```
Met Lys Phe Ser Val Ser Ala Ala Val Leu Ala Phe Ala Ala Ser Val
1               5                   10                  15

Ala Ala Leu Pro Gln His Asp Ser Ala Ala Gly Asn Gly Asn Gly Val
            20                  25                  30

Gly Asn Lys Phe Pro Val Pro Asp Asp Val Thr Val Lys Gln Ala Thr
        35                  40                  45

Asp Lys Cys Gly Asp Gln Ala Gln Leu Ser Cys Cys Asn Lys Ala Thr
    50                  55                  60

Tyr Ala Gly Asp Val Leu Thr Asp Ile Asp Glu Gly Ile Leu Ala Gly
65                  70                  75                  80

Leu Leu Lys Asn Leu Ile Gly Gly Gly Ser Gly Ser Glu Gly Leu Gly
                85                  90                  95

Leu Phe Asp Gln Cys Val Lys Leu Asp Leu Gln Ile Ser Val Ile Gly
            100                 105                 110

Ile Pro Ile Gln Asp Leu Leu Asn Gln Val Asn Lys Gln Cys Lys Gln
        115                 120                 125

Asn Ile Ala Cys Cys Gln Asn Ser Pro Ser Asp Ala Thr Gly Ser Leu
    130                 135                 140

Val Asn Leu Gly Leu Gly Asn Pro Cys Ile Pro Val Ser Leu Leu His
145                 150                 155                 160

Met
```

<210> SEQ ID NO 13
<211> LENGTH: 465
<212> TYPE: DNA
<213> ORGANISM: Artificial Sequence
<220> FEATURE:
<221> NAME/KEY: CDS
<222> LOCATION: (1)..(465)
<223> OTHER INFORMATION: basf-BASF2 from chemically synthesized
      polynucleotide

<400> SEQUENCE: 13

-continued

| | |
|---|---|
| atg aag ttc tcc gtc tcc gcc gcc gtc ctc gcc ttc gcc gcc tcc gtc<br>Met Lys Phe Ser Val Ser Ala Ala Val Leu Ala Phe Ala Ala Ser Val<br>1                5                   10               15 | 48 |
| gcc gcc ctc cct cag cac gac tcc gcc gcc ggc aac ggc aac ggc gtc<br>Ala Ala Leu Pro Gln His Asp Ser Ala Ala Gly Asn Gly Asn Gly Val<br>             20                   25               30 | 96 |
| ggc aac aag ttc cct gtc cct gac gac gtc acc gtc aag cag gcc acc<br>Gly Asn Lys Phe Pro Val Pro Asp Asp Val Thr Val Lys Gln Ala Thr<br>         35                   40               45 | 144 |
| gac aag tgc ggc gac cag gcc cag ctc tcc tgc tgc aac aag gcc acc<br>Asp Lys Cys Gly Asp Gln Ala Gln Leu Ser Cys Cys Asn Lys Ala Thr<br>50                 55                  60 | 192 |
| tac gcc ggc gac gtc acc gac atc gac gag ggc atc ctc gcc ggc ctc<br>Tyr Ala Gly Asp Val Thr Asp Ile Asp Glu Gly Ile Leu Ala Gly Leu<br>65                 70                 75               80 | 240 |
| ctc aag aac ctc atc ggc ggc ggc tcc ggc tcc gag ggc ctc ggc ctc<br>Leu Lys Asn Leu Ile Gly Gly Gly Ser Gly Ser Glu Gly Leu Gly Leu<br>                 85               90               95 | 288 |
| ttc gac cag tgc gtc aag ctc gac ctc cag atc tcc gtc atc ggc atc<br>Phe Asp Gln Cys Val Lys Leu Asp Leu Gln Ile Ser Val Ile Gly Ile<br>               100               105               110 | 336 |
| cct atc cag gac ctc ctc aac cag cag tgc aag cag aac atc gcc tgc<br>Pro Ile Gln Asp Leu Leu Asn Gln Gln Cys Lys Gln Asn Ile Ala Cys<br>         115                   120               125 | 384 |
| tgc cag aac tcc cct tcc gac gcc acc ggc tcc ctc gtc aac ctc ggc<br>Cys Gln Asn Ser Pro Ser Asp Ala Thr Gly Ser Leu Val Asn Leu Gly<br>130                135                 140 | 432 |
| aac cct tgc atc cct gtc tcc ctc ctc cat atg<br>Asn Pro Cys Ile Pro Val Ser Leu Leu His Met<br>145                150               155 | 465 |

<210> SEQ ID NO 14
<211> LENGTH: 155
<212> TYPE: PRT
<213> ORGANISM: Artificial Sequence
<220> FEATURE:
<223> OTHER INFORMATION: basf-BASF2 from chemically synthesized
    polynucleotide

<400> SEQUENCE: 14

Met Lys Phe Ser Val Ser Ala Ala Val Leu Ala Phe Ala Ala Ser Val
1                5                   10               15

Ala Ala Leu Pro Gln His Asp Ser Ala Ala Gly Asn Gly Asn Gly Val
             20                   25               30

Gly Asn Lys Phe Pro Val Pro Asp Asp Val Thr Val Lys Gln Ala Thr
         35                   40               45

Asp Lys Cys Gly Asp Gln Ala Gln Leu Ser Cys Cys Asn Lys Ala Thr
50               55                  60

Tyr Ala Gly Asp Val Thr Asp Ile Asp Glu Gly Ile Leu Ala Gly Leu
65               70                 75               80

Leu Lys Asn Leu Ile Gly Gly Gly Ser Gly Ser Glu Gly Leu Gly Leu
                 85               90               95

Phe Asp Gln Cys Val Lys Leu Asp Leu Gln Ile Ser Val Ile Gly Ile
             100               105               110

Pro Ile Gln Asp Leu Leu Asn Gln Gln Cys Lys Gln Asn Ile Ala Cys
         115                   120               125

Cys Gln Asn Ser Pro Ser Asp Ala Thr Gly Ser Leu Val Asn Leu Gly
130              135                 140

Asn Pro Cys Ile Pro Val Ser Leu Leu His Met

<210> SEQ ID NO 15
<211> LENGTH: 882
<212> TYPE: DNA
<213> ORGANISM: Bacillus subtilis
<220> FEATURE:
<221> NAME/KEY: CDS
<222> LOCATION: (1)..(882)
<223> OTHER INFORMATION: basf-yaad: yaaD

<400> SEQUENCE: 15

| | | | | | | | | | | | | | | | | |
|---|---|---|---|---|---|---|---|---|---|---|---|---|---|---|---|---|
| atg | gct | caa | aca | ggt | act | gaa | cgt | gta | aaa | cgc | gga | atg | gca | gaa | atg | 48 |
| Met | Ala | Gln | Thr | Gly | Thr | Glu | Arg | Val | Lys | Arg | Gly | Met | Ala | Glu | Met | |
| 1 | | | | 5 | | | | | 10 | | | | | 15 | | |
| caa | aaa | ggc | ggc | gtc | atc | atg | gac | gtc | atc | aat | gcg | gaa | caa | gcg | aaa | 96 |
| Gln | Lys | Gly | Gly | Val | Ile | Met | Asp | Val | Ile | Asn | Ala | Glu | Gln | Ala | Lys | |
| | | | 20 | | | | | 25 | | | | | 30 | | | |
| atc | gct | gaa | gaa | gct | gga | gct | gtc | gct | gta | atg | gcg | cta | gaa | cgt | gtg | 144 |
| Ile | Ala | Glu | Glu | Ala | Gly | Ala | Val | Ala | Val | Met | Ala | Leu | Glu | Arg | Val | |
| | | | | 35 | | | | | 40 | | | | | 45 | | |
| cca | gca | gat | att | cgc | gcg | gct | gga | gga | gtt | gcc | cgt | atg | gct | gac | cct | 192 |
| Pro | Ala | Asp | Ile | Arg | Ala | Ala | Gly | Gly | Val | Ala | Arg | Met | Ala | Asp | Pro | |
| | 50 | | | | | 55 | | | | | 60 | | | | | |
| aca | atc | gtg | gaa | gaa | gta | atg | aat | gca | gta | tct | atc | ccg | gta | atg | gca | 240 |
| Thr | Ile | Val | Glu | Glu | Val | Met | Asn | Ala | Val | Ser | Ile | Pro | Val | Met | Ala | |
| 65 | | | | | 70 | | | | | 75 | | | | | 80 | |
| aaa | gcg | cgt | atc | gga | cat | att | gtt | gaa | gcg | cgt | gtg | ctt | gaa | gct | atg | 288 |
| Lys | Ala | Arg | Ile | Gly | His | Ile | Val | Glu | Ala | Arg | Val | Leu | Glu | Ala | Met | |
| | | | | 85 | | | | | 90 | | | | | 95 | | |
| ggt | gtt | gac | tat | att | gat | gaa | agt | gaa | gtt | ctg | acg | ccg | gct | gac | gaa | 336 |
| Gly | Val | Asp | Tyr | Ile | Asp | Glu | Ser | Glu | Val | Leu | Thr | Pro | Ala | Asp | Glu | |
| | | | | 100 | | | | | 105 | | | | | 110 | | |
| gaa | ttt | cat | tta | aat | aaa | aat | gaa | tac | aca | gtt | cct | ttt | gtc | tgt | ggc | 384 |
| Glu | Phe | His | Leu | Asn | Lys | Asn | Glu | Tyr | Thr | Val | Pro | Phe | Val | Cys | Gly | |
| | | | 115 | | | | | 120 | | | | | 125 | | | |
| tgc | cgt | gat | ctt | ggt | gaa | gca | aca | cgc | cgt | att | gcg | gaa | ggt | gct | tct | 432 |
| Cys | Arg | Asp | Leu | Gly | Glu | Ala | Thr | Arg | Arg | Ile | Ala | Glu | Gly | Ala | Ser | |
| | | 130 | | | | | 135 | | | | | 140 | | | | |
| atg | ctt | cgc | aca | aaa | ggt | gag | cct | gga | aca | ggt | aat | att | gtt | gag | gct | 480 |
| Met | Leu | Arg | Thr | Lys | Gly | Glu | Pro | Gly | Thr | Gly | Asn | Ile | Val | Glu | Ala | |
| 145 | | | | | 150 | | | | | 155 | | | | | 160 | |
| gtt | cgc | cat | atg | cgt | aaa | gtt | aac | gct | caa | gtg | cgc | aaa | gta | gtt | gcg | 528 |
| Val | Arg | His | Met | Arg | Lys | Val | Asn | Ala | Gln | Val | Arg | Lys | Val | Val | Ala | |
| | | | | 165 | | | | | 170 | | | | | 175 | | |
| atg | agt | gag | gat | gag | cta | atg | aca | gaa | gcg | aaa | aac | cta | ggt | gct | cct | 576 |
| Met | Ser | Glu | Asp | Glu | Leu | Met | Thr | Glu | Ala | Lys | Asn | Leu | Gly | Ala | Pro | |
| | | | | 180 | | | | | 185 | | | | | 190 | | |
| tac | gag | ctt | ctt | ctt | caa | att | aaa | aaa | gac | ggc | aag | ctt | cct | gtc | gtt | 624 |
| Tyr | Glu | Leu | Leu | Leu | Gln | Ile | Lys | Lys | Asp | Gly | Lys | Leu | Pro | Val | Val | |
| | | | 195 | | | | | 200 | | | | | 205 | | | |
| aac | ttt | gcc | gct | ggc | ggc | gta | gca | act | cca | gct | gat | gct | gct | ctc | atg | 672 |
| Asn | Phe | Ala | Ala | Gly | Gly | Val | Ala | Thr | Pro | Ala | Asp | Ala | Ala | Leu | Met | |
| | | 210 | | | | | 215 | | | | | 220 | | | | |
| atg | cag | ctt | ggt | gct | gac | gga | gta | ttt | gtt | ggt | tct | ggt | att | ttt | aaa | 720 |
| Met | Gln | Leu | Gly | Ala | Asp | Gly | Val | Phe | Val | Gly | Ser | Gly | Ile | Phe | Lys | |
| 225 | | | | | 230 | | | | | 235 | | | | | 240 | |
| tca | gac | aac | cct | gct | aaa | ttt | gcg | aaa | gca | att | gtg | gaa | gca | aca | act | 768 |
| Ser | Asp | Asn | Pro | Ala | Lys | Phe | Ala | Lys | Ala | Ile | Val | Glu | Ala | Thr | Thr | |
| | | | 245 | | | | | 250 | | | | | 255 | | | |
| cac | ttt | act | gat | tac | aaa | tta | atc | gct | gag | ttg | tca | aaa | gag | ctt | ggt | 816 |
| His | Phe | Thr | Asp | Tyr | Lys | Leu | Ile | Ala | Glu | Leu | Ser | Lys | Glu | Leu | Gly | |

```
                   260                 265                 270
act gca atg aaa ggg att gaa atc tca aac tta ctt cca gaa cag cgt        864
Thr Ala Met Lys Gly Ile Glu Ile Ser Asn Leu Leu Pro Glu Gln Arg
        275                 280                 285 atg caa gaa cgc ggc tgg                                                882
Met Gln Glu Arg Gly Trp
    290

<210> SEQ ID NO 16
<211> LENGTH: 294
<212> TYPE: PRT
<213> ORGANISM: Bacillus subtilis
<220> FEATURE:
<223> OTHER INFORMATION: basf-yaad: yaaD

<400> SEQUENCE: 16

Met Ala Gln Thr Gly Thr Glu Arg Val Lys Arg Gly Met Ala Glu Met
1               5                   10                  15

Gln Lys Gly Gly Val Ile Met Asp Val Ile Asn Ala Glu Gln Ala Lys
            20                  25                  30

Ile Ala Glu Glu Ala Gly Ala Val Ala Val Met Ala Leu Glu Arg Val
        35                  40                  45

Pro Ala Asp Ile Arg Ala Ala Gly Gly Val Ala Arg Met Ala Asp Pro
    50                  55                  60

Thr Ile Val Glu Glu Val Met Asn Ala Val Ser Ile Pro Val Met Ala
65                  70                  75                  80

Lys Ala Arg Ile Gly His Ile Val Glu Ala Arg Val Leu Glu Ala Met
                85                  90                  95

Gly Val Asp Tyr Ile Asp Glu Ser Glu Val Leu Thr Pro Ala Asp Glu
            100                 105                 110

Glu Phe His Leu Asn Lys Asn Glu Tyr Thr Val Pro Phe Val Cys Gly
        115                 120                 125

Cys Arg Asp Leu Gly Glu Ala Thr Arg Arg Ile Ala Glu Gly Ala Ser
    130                 135                 140

Met Leu Arg Thr Lys Gly Glu Pro Gly Thr Gly Asn Ile Val Glu Ala
145                 150                 155                 160

Val Arg His Met Arg Lys Val Asn Ala Gln Val Arg Lys Val Val Ala
                165                 170                 175

Met Ser Glu Asp Glu Leu Met Thr Glu Ala Lys Asn Leu Gly Ala Pro
            180                 185                 190

Tyr Glu Leu Leu Leu Gln Ile Lys Lys Asp Gly Lys Leu Pro Val Val
        195                 200                 205

Asn Phe Ala Ala Gly Gly Val Ala Thr Pro Ala Asp Ala Ala Leu Met
    210                 215                 220

Met Gln Leu Gly Ala Asp Gly Val Phe Val Gly Ser Gly Ile Phe Lys
225                 230                 235                 240

Ser Asp Asn Pro Ala Lys Phe Ala Lys Ala Ile Val Glu Ala Thr Thr
                245                 250                 255

His Phe Thr Asp Tyr Lys Leu Ile Ala Glu Leu Ser Lys Glu Leu Gly
            260                 265                 270

Thr Ala Met Lys Gly Ile Glu Ile Ser Asn Leu Leu Pro Glu Gln Arg
        275                 280                 285

Met Gln Glu Arg Gly Trp
    290

<210> SEQ ID NO 17
<211> LENGTH: 591
```

-continued

```
<212> TYPE: DNA
<213> ORGANISM: Bacillus subtilis
<220> FEATURE:
<221> NAME/KEY: CDS
<222> LOCATION: (1)..(591)
<223> OTHER INFORMATION: basf-yaae: yaaE with Gly insert at position 2

<400> SEQUENCE: 17 atg gga tta aca ata ggt gta cta gga ctt caa gga gca gtt aga gag      48
Met Gly Leu Thr Ile Gly Val Leu Gly Leu Gln Gly Ala Val Arg Glu
1               5                   10                  15 cac atc cat gcg att gaa gca tgc ggc gcg gct ggt ctt gtc gta aaa      96
His Ile His Ala Ile Glu Ala Cys Gly Ala Ala Gly Leu Val Val Lys
            20                  25                  30 cgt ccg gag cag ctg aac gaa gtt gac ggg ttg att ttg ccg ggc ggt     144
Arg Pro Glu Gln Leu Asn Glu Val Asp Gly Leu Ile Leu Pro Gly Gly
        35                  40                  45 gag agc acg acg atg cgc cgt ttg atc gat acg tat caa ttc atg gag     192
Glu Ser Thr Thr Met Arg Arg Leu Ile Asp Thr Tyr Gln Phe Met Glu
    50                  55                  60 ccg ctt cgt gaa ttc gct gct cag ggc aaa ccg atg ttt gga aca tgt     240
Pro Leu Arg Glu Phe Ala Ala Gln Gly Lys Pro Met Phe Gly Thr Cys
65                  70                  75                  80 gcc gga tta att ata tta gca aaa gaa att gcc ggt tca gat aat cct     288
Ala Gly Leu Ile Ile Leu Ala Lys Glu Ile Ala Gly Ser Asp Asn Pro
                85                  90                  95 cat tta ggt ctt ctg aat gtg gtt gta gaa cgt aat tca ttt ggc cgg     336
His Leu Gly Leu Leu Asn Val Val Val Glu Arg Asn Ser Phe Gly Arg
            100                 105                 110 cag gtt gac agc ttt gaa gct gat tta aca att aaa ggc ttg gac gag     384
Gln Val Asp Ser Phe Glu Ala Asp Leu Thr Ile Lys Gly Leu Asp Glu
        115                 120                 125 cct ttt act ggg gta ttc atc cgt gct ccg cat att tta gaa gct ggt     432
Pro Phe Thr Gly Val Phe Ile Arg Ala Pro His Ile Leu Glu Ala Gly
    130                 135                 140 gaa aat gtt gaa gtt cta tcg gag cat aat ggt cgt att gta gcc gcg     480
Glu Asn Val Glu Val Leu Ser Glu His Asn Gly Arg Ile Val Ala Ala
145                 150                 155                 160 aaa cag ggg caa ttc ctt ggc tgc tca ttc cat ccg gag ctg aca gaa     528
Lys Gln Gly Gln Phe Leu Gly Cys Ser Phe His Pro Glu Leu Thr Glu
                165                 170                 175 gat cac cga gtg acg cag ctg ttt gtt gaa atg gtt gag gaa tat aag     576
Asp His Arg Val Thr Gln Leu Phe Val Glu Met Val Glu Glu Tyr Lys
            180                 185                 190 caa aag gca ctt gta                                                 591
Gln Lys Ala Leu Val
        195

<210> SEQ ID NO 18
<211> LENGTH: 197
<212> TYPE: PRT
<213> ORGANISM: Bacillus subtilis
<220> FEATURE:
<223> OTHER INFORMATION: basf-yaae: yaaE with Gly insert at position 2

<400> SEQUENCE: 18

Met Gly Leu Thr Ile Gly Val Leu Gly Leu Gln Gly Ala Val Arg Glu
1               5                   10                  15

His Ile His Ala Ile Glu Ala Cys Gly Ala Ala Gly Leu Val Val Lys
            20                  25                  30

Arg Pro Glu Gln Leu Asn Glu Val Asp Gly Leu Ile Leu Pro Gly Gly
        35                  40                  45
```

```
Glu Ser Thr Thr Met Arg Arg Leu Ile Asp Thr Tyr Gln Phe Met Glu
    50                  55                  60

Pro Leu Arg Glu Phe Ala Ala Gln Gly Lys Pro Met Phe Gly Thr Cys
 65                  70                  75                  80

Ala Gly Leu Ile Ile Leu Ala Lys Glu Ile Ala Gly Ser Asp Asn Pro
                 85                  90                  95

His Leu Gly Leu Leu Asn Val Val Glu Arg Asn Ser Phe Gly Arg
                100                 105                 110

Gln Val Asp Ser Phe Glu Ala Asp Leu Thr Ile Lys Gly Leu Asp Glu
                115                 120                 125

Pro Phe Thr Gly Val Phe Ile Arg Ala Pro His Ile Leu Glu Ala Gly
        130                 135                 140

Glu Asn Val Glu Val Leu Ser Glu His Asn Gly Arg Ile Val Ala Ala
145                 150                 155                 160

Lys Gln Gly Gln Phe Leu Gly Cys Ser Phe His Pro Glu Leu Thr Glu
                165                 170                 175

Asp His Arg Val Thr Gln Leu Phe Val Glu Met Val Glu Tyr Lys
                180                 185                 190

Gln Lys Ala Leu Val
        195
```

<210> SEQ ID NO 19
<211> LENGTH: 1329
<212> TYPE: DNA
<213> ORGANISM: Artificial Sequence
<220> FEATURE:
<221> NAME/KEY: CDS
<222> LOCATION: (1)..(1329)
<223> OTHER INFORMATION: basf-yaad-Xa-dewA-his: fusion of Bacillus
      subtilis yaaD and N-terminal factor Xa proteinase cleavage site
      and Aspergillus nidulans hydrophobin dewA and his6

<400> SEQUENCE: 19

```
atg gct caa aca ggt act gaa cgt gta aaa cgc gga atg gca gaa atg      48
Met Ala Gln Thr Gly Thr Glu Arg Val Lys Arg Gly Met Ala Glu Met
1               5                   10                  15 caa aaa ggc ggc gtc atc atg gac gtc atc aat gcg gaa caa gcg aaa     96
Gln Lys Gly Gly Val Ile Met Asp Val Ile Asn Ala Glu Gln Ala Lys
            20                  25                  30 atc gct gaa gaa gct gga gct gtc gct gta atg gcg cta gaa cgt gtg    144
Ile Ala Glu Glu Ala Gly Ala Val Ala Val Met Ala Leu Glu Arg Val
        35                  40                  45 cca gca gat att cgc gcg gct gga gga gtt gcc cgt atg gct gac cct    192
Pro Ala Asp Ile Arg Ala Ala Gly Gly Val Ala Arg Met Ala Asp Pro
    50                  55                  60 aca atc gtg gaa gaa gta atg aat gca gta tct atc ccg gta atg gca    240
Thr Ile Val Glu Glu Val Met Asn Ala Val Ser Ile Pro Val Met Ala
65                  70                  75                  80 aaa gcg cgt atc gga cat att gtt gaa gcg cgt gtg ctt gaa gct atg    288
Lys Ala Arg Ile Gly His Ile Val Glu Ala Arg Val Leu Glu Ala Met
                85                  90                  95 ggt gtt gac tat att gat gaa agt gaa gtt ctg acg ccg gct gac gaa    336
Gly Val Asp Tyr Ile Asp Glu Ser Glu Val Leu Thr Pro Ala Asp Glu
            100                 105                 110 gaa ttt cat tta aat aaa aat gaa tac aca gtt cct ttt gtc tgt ggc    384
Glu Phe His Leu Asn Lys Asn Glu Tyr Thr Val Pro Phe Val Cys Gly
        115                 120                 125 tgc cgt gat ctt ggt gaa gca aca cgc cgt att gcg gaa ggt gct tct    432
Cys Arg Asp Leu Gly Glu Ala Thr Arg Arg Ile Ala Glu Gly Ala Ser
    130                 135                 140
```

```
atg ctt cgc aca aaa ggt gag cct gga aca ggt aat att gtt gag gct      480
Met Leu Arg Thr Lys Gly Glu Pro Gly Thr Gly Asn Ile Val Glu Ala
145                 150                 155                 160 gtt cgc cat atg cgt aaa gtt aac gct caa gtg cgc aaa gta gtt gcg      528
Val Arg His Met Arg Lys Val Asn Ala Gln Val Arg Lys Val Val Ala
                165                 170                 175 atg agt gag gat gag cta atg aca gaa gcg aaa aac cta ggt gct cct      576
Met Ser Glu Asp Glu Leu Met Thr Glu Ala Lys Asn Leu Gly Ala Pro
        180                 185                 190 tac gag ctt ctt ctt caa att aaa aaa gac ggc aag ctt cct gtc gtt      624
Tyr Glu Leu Leu Leu Gln Ile Lys Lys Asp Gly Lys Leu Pro Val Val
            195                 200                 205 aac ttt gcc gct ggc ggc gta gca act cca gct gat gct gct ctc atg      672
Asn Phe Ala Ala Gly Gly Val Ala Thr Pro Ala Asp Ala Ala Leu Met
    210                 215                 220 atg cag ctt ggt gct gac gga gta ttt gtt ggt tct ggt att ttt aaa      720
Met Gln Leu Gly Ala Asp Gly Val Phe Val Gly Ser Gly Ile Phe Lys
225                 230                 235                 240 tca gac aac cct gct aaa ttt gcg aaa gca att gtg gaa gca aca act      768
Ser Asp Asn Pro Ala Lys Phe Ala Lys Ala Ile Val Glu Ala Thr Thr
                245                 250                 255 cac ttt act gat tac aaa tta atc gct gag ttg tca aaa gag ctt ggt      816
His Phe Thr Asp Tyr Lys Leu Ile Ala Glu Leu Ser Lys Glu Leu Gly
                260                 265                 270 act gca atg aaa ggg att gaa atc tca aac tta ctt cca gaa cag cgt      864
Thr Ala Met Lys Gly Ile Glu Ile Ser Asn Leu Leu Pro Glu Gln Arg
        275                 280                 285 atg caa gaa cgc ggc tgg aga tcc att gaa ggc cgc atg cgc ttc atc      912
Met Gln Glu Arg Gly Trp Arg Ser Ile Glu Gly Arg Met Arg Phe Ile
    290                 295                 300 gtc tct ctc ctc gcc ttc act gcc gcg gcc acc gcg acc gcc ctc ccg      960
Val Ser Leu Leu Ala Phe Thr Ala Ala Ala Thr Ala Thr Ala Leu Pro
305                 310                 315                 320 gcc tct gcc gca aag aac gcg aag ctg gcc acc tcg gcg gcc ttc gcc     1008
Ala Ser Ala Ala Lys Asn Ala Lys Leu Ala Thr Ser Ala Ala Phe Ala
                325                 330                 335 aag cag gct gaa ggc acc acc tgc aat gtc ggc tcg atc gct tgc tgc     1056
Lys Gln Ala Glu Gly Thr Thr Cys Asn Val Gly Ser Ile Ala Cys Cys
                340                 345                 350 aac tcc ccc gct gag acc aac aac gac agt ctg ttg agc ggt ctg ctc     1104
Asn Ser Pro Ala Glu Thr Asn Asn Asp Ser Leu Leu Ser Gly Leu Leu
        355                 360                 365 ggt gct ggc ctt ctc aac ggg ctc tcg ggc aac act ggc agc gcc tgc     1152
Gly Ala Gly Leu Leu Asn Gly Leu Ser Gly Asn Thr Gly Ser Ala Cys
370                 375                 380 gcc aag gcg agc ttg att gac cag ctg ggt ctg ctc gct ctc gtc gac     1200
Ala Lys Ala Ser Leu Ile Asp Gln Leu Gly Leu Leu Ala Leu Val Asp
385                 390                 395                 400 cac act gag gaa ggc ccc gtc tgc aag aac atc gtc gct tgc tgc cct     1248
His Thr Glu Glu Gly Pro Val Cys Lys Asn Ile Val Ala Cys Cys Pro
                405                 410                 415 gag gga acc acc aac tgt gtt gcc gtc gac aac gct ggc gct ggt acc     1296
Glu Gly Thr Thr Asn Cys Val Ala Val Asp Asn Ala Gly Ala Gly Thr
                420                 425                 430 aag gct gag gga tct cat cac cat cac cat cac                         1329
Lys Ala Glu Gly Ser His His His His His His
        435                 440

<210> SEQ ID NO 20
<211> LENGTH: 443
<212> TYPE: PRT
```

<213> ORGANISM: Artificial Sequence
<220> FEATURE:
<223> OTHER INFORMATION: basf-yaad-Xa-dewA-his: fusion of Bacillus
subtilis yaaD and N-terminal factor Xa proteinase cleavage site
and Aspergillus nidulans hydrophobin dewA and his6

<400> SEQUENCE: 20

```
Met Ala Gln Thr Gly Thr Glu Arg Val Lys Arg Gly Met Ala Glu Met
 1               5                  10                  15

Gln Lys Gly Gly Val Ile Met Asp Val Ile Asn Ala Glu Gln Ala Lys
             20                  25                  30

Ile Ala Glu Glu Ala Gly Ala Val Ala Val Met Ala Leu Glu Arg Val
         35                  40                  45

Pro Ala Asp Ile Arg Ala Ala Gly Gly Val Ala Arg Met Ala Asp Pro
 50                  55                  60

Thr Ile Val Glu Glu Val Met Asn Ala Val Ser Ile Pro Val Met Ala
 65                  70                  75                  80

Lys Ala Arg Ile Gly His Ile Val Glu Ala Arg Val Leu Glu Ala Met
                 85                  90                  95

Gly Val Asp Tyr Ile Asp Glu Ser Glu Val Leu Thr Pro Ala Asp Glu
            100                 105                 110

Glu Phe His Leu Asn Lys Asn Glu Tyr Thr Val Pro Phe Val Cys Gly
        115                 120                 125

Cys Arg Asp Leu Gly Glu Ala Thr Arg Arg Ile Ala Glu Gly Ala Ser
    130                 135                 140

Met Leu Arg Thr Lys Gly Glu Pro Gly Thr Gly Asn Ile Val Glu Ala
145                 150                 155                 160

Val Arg His Met Arg Lys Val Asn Ala Gln Val Arg Lys Val Val Ala
                165                 170                 175

Met Ser Glu Asp Glu Leu Met Thr Glu Ala Lys Asn Leu Gly Ala Pro
            180                 185                 190

Tyr Glu Leu Leu Leu Gln Ile Lys Lys Asp Gly Lys Leu Pro Val Val
        195                 200                 205

Asn Phe Ala Ala Gly Gly Val Ala Thr Pro Ala Asp Ala Ala Leu Met
    210                 215                 220

Met Gln Leu Gly Ala Asp Gly Val Phe Val Gly Ser Gly Ile Phe Lys
225                 230                 235                 240

Ser Asp Asn Pro Ala Lys Phe Ala Lys Ala Ile Val Glu Ala Thr Thr
                245                 250                 255

His Phe Thr Asp Tyr Lys Leu Ile Ala Glu Leu Ser Lys Glu Leu Gly
            260                 265                 270

Thr Ala Met Lys Gly Ile Glu Ile Ser Asn Leu Leu Pro Glu Gln Arg
        275                 280                 285

Met Gln Glu Arg Gly Trp Arg Ser Ile Glu Gly Arg Met Arg Phe Ile
    290                 295                 300

Val Ser Leu Leu Ala Phe Thr Ala Ala Ala Thr Ala Thr Ala Leu Pro
305                 310                 315                 320

Ala Ser Ala Ala Lys Asn Ala Lys Leu Ala Thr Ser Ala Ala Phe Ala
                325                 330                 335

Lys Gln Ala Glu Gly Thr Thr Cys Asn Val Gly Ser Ile Ala Cys Cys
            340                 345                 350

Asn Ser Pro Ala Glu Thr Asn Asn Asp Ser Leu Leu Ser Gly Leu Leu
        355                 360                 365

Gly Ala Gly Leu Leu Asn Gly Leu Ser Gly Asn Thr Gly Ser Ala Cys
    370                 375                 380
```

```
Ala Lys Ala Ser Leu Ile Asp Gln Leu Gly Leu Leu Ala Leu Val Asp
385                 390                 395                 400

His Thr Glu Glu Gly Pro Val Cys Lys Asn Ile Val Ala Cys Cys Pro
            405                 410                 415

Glu Gly Thr Thr Asn Cys Val Ala Val Asp Asn Ala Gly Ala Gly Thr
        420                 425                 430

Lys Ala Glu Gly Ser His His His His His His
        435                 440
```

<210> SEQ ID NO 21
<211> LENGTH: 1395
<212> TYPE: DNA
<213> ORGANISM: Artificial Sequence
<220> FEATURE:
<221> NAME/KEY: CDS
<222> LOCATION: (1)..(1395)
<223> OTHER INFORMATION: basf-yaaD-Xa-rodA-his: fusion of Bacillus
      subtilis yaaD and N-terminal factor Xa proteinase cleavage site
      and Aspergillus nidulans hydrophobin rodA and his6

<400> SEQUENCE: 21

```
atg gct caa aca ggt act gaa cgt gta aaa cgc gga atg gca gaa atg         48
Met Ala Gln Thr Gly Thr Glu Arg Val Lys Arg Gly Met Ala Glu Met
1               5                   10                  15 caa aaa ggc ggc gtc atc atg gac gtc atc aat gcg gaa caa gcg aaa         96
Gln Lys Gly Gly Val Ile Met Asp Val Ile Asn Ala Glu Gln Ala Lys
                20                  25                  30 atc gct gaa gaa gct gga gct gtc gct gta atg gcg cta gaa cgt gtg        144
Ile Ala Glu Glu Ala Gly Ala Val Ala Val Met Ala Leu Glu Arg Val
            35                  40                  45 cca gca gat att cgc gcg gct gga gga gtt gcc cgt atg gct gac cct        192
Pro Ala Asp Ile Arg Ala Ala Gly Gly Val Ala Arg Met Ala Asp Pro
        50                  55                  60 aca atc gtg gaa gaa gta atg aat gca gta tct atc ccg gta atg gca        240
Thr Ile Val Glu Glu Val Met Asn Ala Val Ser Ile Pro Val Met Ala
65                  70                  75                  80 aaa gcg cgt atc gga cat att gtt gaa gcg cgt gtg ctt gaa gct atg        288
Lys Ala Arg Ile Gly His Ile Val Glu Ala Arg Val Leu Glu Ala Met
                85                  90                  95 ggt gtt gac tat att gat gaa agt gaa gtt ctg acg ccg gct gac gaa        336
Gly Val Asp Tyr Ile Asp Glu Ser Glu Val Leu Thr Pro Ala Asp Glu
                100                 105                 110 gaa ttt cat tta aat aaa aat gaa tac aca gtt cct ttt gtc tgt ggc        384
Glu Phe His Leu Asn Lys Asn Glu Tyr Thr Val Pro Phe Val Cys Gly
            115                 120                 125 tgc cgt gat ctt ggt gaa gca aca cgc cgt att gcg gaa ggt gct tct        432
Cys Arg Asp Leu Gly Glu Ala Thr Arg Arg Ile Ala Glu Gly Ala Ser
        130                 135                 140 atg ctt cgc aca aaa ggt gag cct gga aca ggt aat att gtt gag gct        480
Met Leu Arg Thr Lys Gly Glu Pro Gly Thr Gly Asn Ile Val Glu Ala
145                 150                 155                 160 gtt cgc cat atg cgt aaa gtt aac gct caa gtg cgc aaa gta gtt gcg        528
Val Arg His Met Arg Lys Val Asn Ala Gln Val Arg Lys Val Val Ala
                165                 170                 175 atg agt gag gat gag cta atg aca gaa gcg aaa aac cta ggt gct cct        576
Met Ser Glu Asp Glu Leu Met Thr Glu Ala Lys Asn Leu Gly Ala Pro
                180                 185                 190 tac gag ctt ctt ctt caa att aaa aaa gac ggc aag ctt cct gtc gtt        624
Tyr Glu Leu Leu Leu Gln Ile Lys Lys Asp Gly Lys Leu Pro Val Val
            195                 200                 205 aac ttt gcc gct ggc ggc gta gca act cca gct gat gct gct ctc atg        672
Asn Phe Ala Ala Gly Gly Val Ala Thr Pro Ala Asp Ala Ala Leu Met
```

```
atg cag ctt ggt gct gac gga gta ttt gtt ggt tct ggt att ttt aaa    720
Met Gln Leu Gly Ala Asp Gly Val Phe Val Gly Ser Gly Ile Phe Lys
225                 230                 235                 240 tca gac aac cct gct aaa ttt gcg aaa gca att gtg gaa gca aca act    768
Ser Asp Asn Pro Ala Lys Phe Ala Lys Ala Ile Val Glu Ala Thr Thr
                245                 250                 255 cac ttt act gat tac aaa tta atc gct gag ttg tca aaa gag ctt ggt    816
His Phe Thr Asp Tyr Lys Leu Ile Ala Glu Leu Ser Lys Glu Leu Gly
            260                 265                 270 act gca atg aaa ggg att gaa atc tca aac tta ctt cca gaa cag cgt    864
Thr Ala Met Lys Gly Ile Glu Ile Ser Asn Leu Leu Pro Glu Gln Arg
        275                 280                 285 atg caa gaa cgc ggc tgg aga tct att gaa ggc cgc atg aag ttc tcc    912
Met Gln Glu Arg Gly Trp Arg Ser Ile Glu Gly Arg Met Lys Phe Ser
    290                 295                 300 att gct gcc gct gtc gtt gct ttc gcc gcc tcc gtc gcg gcc ctc cct    960
Ile Ala Ala Ala Val Val Ala Phe Ala Ala Ser Val Ala Ala Leu Pro
305                 310                 315                 320 cct gcc cat gat tcc cag ttc gct ggc aat ggt gtt ggc aac aag ggc   1008
Pro Ala His Asp Ser Gln Phe Ala Gly Asn Gly Val Gly Asn Lys Gly
                325                 330                 335 aac agc aac gtc aag ttc cct gtc ccc gaa aac gtg acc gtc aag cag   1056
Asn Ser Asn Val Lys Phe Pro Val Pro Glu Asn Val Thr Val Lys Gln
            340                 345                 350 gcc tcc gac aag tgc ggt gac cag gcc cag ctc tct tgc tgc aac aag   1104
Ala Ser Asp Lys Cys Gly Asp Gln Ala Gln Leu Ser Cys Cys Asn Lys
        355                 360                 365 gcc acg tac gcc ggt gac acc aca acc gtt gat gag ggt ctt ctg tct   1152
Ala Thr Tyr Ala Gly Asp Thr Thr Thr Val Asp Glu Gly Leu Leu Ser
    370                 375                 380 ggt gcc ctc agc ggc ctc atc ggc gcc ggg tct ggt gcc gaa ggt ctt   1200
Gly Ala Leu Ser Gly Leu Ile Gly Ala Gly Ser Gly Ala Glu Gly Leu
385                 390                 395                 400 ggt ctc ttc gat cag tgc tcc aag ctt gat gtt gct gtc ctc att ggc   1248
Gly Leu Phe Asp Gln Cys Ser Lys Leu Asp Val Ala Val Leu Ile Gly
                405                 410                 415 atc caa gat ctt gtc aac cag aag tgc aag caa aac att gcc tgc tgc   1296
Ile Gln Asp Leu Val Asn Gln Lys Cys Lys Gln Asn Ile Ala Cys Cys
            420                 425                 430 cag aac tcc ccc tcc agc gcg gat ggc aac ctt att ggt gtc ggt ctc   1344
Gln Asn Ser Pro Ser Ser Ala Asp Gly Asn Leu Ile Gly Val Gly Leu
        435                 440                 445 cct tgc gtt gcc ctt ggc tcc atc ctc gga tct cat cac cat cac cat   1392
Pro Cys Val Ala Leu Gly Ser Ile Leu Gly Ser His His His His His
    450                 455                 460 cac                                                                1395
His
465

<210> SEQ ID NO 22
<211> LENGTH: 465
<212> TYPE: PRT
<213> ORGANISM: Artificial Sequence
<220> FEATURE:
<223> OTHER INFORMATION: basf-yaaD-Xa-rodA-his: fusion of Bacillus
      subtilis yaaD and N-terminal factor Xa proteinase cleavage site
      and Aspergillus nidulans hydrophobin rodA and his6

<400> SEQUENCE: 22

Met Ala Gln Thr Gly Thr Glu Arg Val Lys Arg Gly Met Ala Glu Met
1               5                   10                  15
```

-continued

```
Gln Lys Gly Gly Val Ile Met Asp Val Ile Asn Ala Glu Gln Ala Lys
             20                  25                  30
Ile Ala Glu Glu Ala Gly Ala Val Ala Val Met Ala Leu Glu Arg Val
         35                  40                  45
Pro Ala Asp Ile Arg Ala Gly Gly Val Ala Arg Met Ala Asp Pro
 50                  55                  60
Thr Ile Val Glu Glu Val Met Asn Ala Val Ser Ile Pro Val Met Ala
 65                  70                  75                  80
Lys Ala Arg Ile Gly His Ile Val Glu Ala Arg Val Leu Glu Ala Met
                 85                  90                  95
Gly Val Asp Tyr Ile Asp Glu Ser Glu Val Leu Thr Pro Ala Asp Glu
                100                 105                 110
Glu Phe His Leu Asn Lys Asn Glu Tyr Thr Val Pro Phe Val Cys Gly
            115                 120                 125
Cys Arg Asp Leu Gly Glu Ala Thr Arg Arg Ile Ala Glu Gly Ala Ser
130                 135                 140
Met Leu Arg Thr Lys Gly Glu Pro Gly Thr Gly Asn Ile Val Glu Ala
145                 150                 155                 160
Val Arg His Met Arg Lys Val Asn Ala Gln Val Arg Lys Val Val Ala
                165                 170                 175
Met Ser Glu Asp Glu Leu Met Thr Glu Ala Lys Asn Leu Gly Ala Pro
            180                 185                 190
Tyr Glu Leu Leu Leu Gln Ile Lys Lys Asp Gly Lys Leu Pro Val Val
            195                 200                 205
Asn Phe Ala Ala Gly Gly Val Ala Thr Pro Ala Asp Ala Ala Leu Met
210                 215                 220
Met Gln Leu Gly Ala Asp Gly Val Phe Val Gly Ser Gly Ile Phe Lys
225                 230                 235                 240
Ser Asp Asn Pro Ala Lys Phe Ala Lys Ala Ile Val Glu Ala Thr Thr
                245                 250                 255
His Phe Thr Asp Tyr Lys Leu Ile Ala Glu Leu Ser Lys Glu Leu Gly
            260                 265                 270
Thr Ala Met Lys Gly Ile Glu Ile Ser Asn Leu Leu Pro Glu Gln Arg
            275                 280                 285
Met Gln Glu Arg Gly Trp Arg Ser Ile Glu Gly Arg Met Lys Phe Ser
290                 295                 300
Ile Ala Ala Ala Val Val Ala Phe Ala Ala Ser Val Ala Ala Leu Pro
305                 310                 315                 320
Pro Ala His Asp Ser Gln Phe Ala Gly Asn Gly Val Gly Asn Lys Gly
                325                 330                 335
Asn Ser Asn Val Lys Phe Pro Val Pro Glu Asn Val Thr Val Lys Gln
            340                 345                 350
Ala Ser Asp Lys Cys Gly Asp Gln Ala Gln Leu Ser Cys Cys Asn Lys
            355                 360                 365
Ala Thr Tyr Ala Gly Asp Thr Thr Val Asp Glu Gly Leu Leu Ser
370                 375                 380
Gly Ala Leu Ser Gly Leu Ile Gly Ala Gly Ser Gly Ala Glu Gly Leu
385                 390                 395                 400
Gly Leu Phe Asp Gln Cys Ser Lys Leu Asp Val Ala Val Leu Ile Gly
                405                 410                 415
Ile Gln Asp Leu Val Asn Gln Lys Cys Lys Gln Asn Ile Ala Cys Cys
            420                 425                 430
Gln Asn Ser Pro Ser Ser Ala Asp Gly Asn Leu Ile Gly Val Gly Leu
```

```
                          435                 440                 445
        Pro Cys Val Ala Leu Gly Ser Ile Leu Gly Ser His His His His
                          450                 455                 460

His
        465

<210> SEQ ID NO 23
<211> LENGTH: 1407
<212> TYPE: DNA
<213> ORGANISM: Artificial Sequence
<220> FEATURE:
<221> NAME/KEY: CDS
<222> LOCATION: (1)..(1407)
<223> OTHER INFORMATION: basf-yaaD-Xa-BASF1-his: fusion of Bacillus
      subtilis yaaD and N-terminal factor Xa proteinase cleavage site
      and artificial hydrophobin; BASF1  BASF1 from chemically
      synthesized polynucleotide

<400> SEQUENCE: 23 atg gct caa aca ggt act gaa cgt gta aaa cgc gga atg gca gaa atg        48
Met Ala Gln Thr Gly Thr Glu Arg Val Lys Arg Gly Met Ala Glu Met
1               5                   10                  15 caa aaa ggc ggc gtc atc atg gac gtc atc aat gcg gaa caa gcg aaa        96
Gln Lys Gly Gly Val Ile Met Asp Val Ile Asn Ala Glu Gln Ala Lys
                20                  25                  30 atc gct gaa gaa gct gga gct gtc gct gta atg gcg cta gaa cgt gtg       144
Ile Ala Glu Glu Ala Gly Ala Val Ala Val Met Ala Leu Glu Arg Val
            35                  40                  45 cca gca gat att cgc gcg gct gga gga gtt gcc cgt atg gct gac cct       192
Pro Ala Asp Ile Arg Ala Ala Gly Gly Val Ala Arg Met Ala Asp Pro
        50                  55                  60 aca atc gtg gaa gaa gta atg aat gca gta tct atc ccg gta atg gca       240
Thr Ile Val Glu Glu Val Met Asn Ala Val Ser Ile Pro Val Met Ala
65                  70                  75                  80 aaa gcg cgt atc gga cat att gtt gaa gcg cgt gtg ctt gaa gct atg       288
Lys Ala Arg Ile Gly His Ile Val Glu Ala Arg Val Leu Glu Ala Met
                85                  90                  95 ggt gtt gac tat att gat gaa agt gaa gtt ctg acg ccg gct gac gaa       336
Gly Val Asp Tyr Ile Asp Glu Ser Glu Val Leu Thr Pro Ala Asp Glu
                100                 105                 110 gaa ttt cat tta aat aaa aat gaa tac aca gtt cct ttt gtc tgt ggc       384
Glu Phe His Leu Asn Lys Asn Glu Tyr Thr Val Pro Phe Val Cys Gly
            115                 120                 125 tgc cgt gat ctt ggt gaa gca aca cgc cgt att gcg gaa ggt gct tct       432
Cys Arg Asp Leu Gly Glu Ala Thr Arg Arg Ile Ala Glu Gly Ala Ser
        130                 135                 140 atg ctt cgc aca aaa ggt gag cct gga aca ggt aat att gtt gag gct       480
Met Leu Arg Thr Lys Gly Glu Pro Gly Thr Gly Asn Ile Val Glu Ala
145                 150                 155                 160 gtt cgc cat atg cgt aaa gtt aac gct caa gtg cgc aaa gta gtt gcg       528
Val Arg His Met Arg Lys Val Asn Ala Gln Val Arg Lys Val Val Ala
                165                 170                 175 atg agt gag gat gag cta atg aca gaa gcg aaa aac cta ggt gct cct       576
Met Ser Glu Asp Glu Leu Met Thr Glu Ala Lys Asn Leu Gly Ala Pro
                180                 185                 190 tac gag ctt ctt ctt caa att aaa aaa gac ggc aag ctt cct gtc gtt       624
Tyr Glu Leu Leu Leu Gln Ile Lys Lys Asp Gly Lys Leu Pro Val Val
            195                 200                 205 aac ttt gcc gct ggc ggc gta gca act cca gct gat gct gct ctc atg       672
Asn Phe Ala Ala Gly Gly Val Ala Thr Pro Ala Asp Ala Ala Leu Met
        210                 215                 220 atg cag ctt ggt gct gac gga gta ttt gtt ggt tct ggt att ttt aaa       720
```

```
Met Gln Leu Gly Ala Asp Gly Val Phe Val Gly Ser Gly Ile Phe Lys
225                 230                 235                 240 tca gac aac cct gct aaa ttt gcg aaa gca att gtg gaa gca aca act      768
Ser Asp Asn Pro Ala Lys Phe Ala Lys Ala Ile Val Glu Ala Thr Thr
                    245                 250                 255 cac ttt act gat tac aaa tta atc gct gag ttg tca aaa gag ctt ggt      816
His Phe Thr Asp Tyr Lys Leu Ile Ala Glu Leu Ser Lys Glu Leu Gly
                260                 265                 270 act gca atg aaa ggg att gaa atc tca aac tta ctt cca gaa cag cgt      864
Thr Ala Met Lys Gly Ile Glu Ile Ser Asn Leu Leu Pro Glu Gln Arg
            275                 280                 285 atg caa gaa cgc ggc tgg aga tct att gaa ggc cgc atg aag ttc tcc      912
Met Gln Glu Arg Gly Trp Arg Ser Ile Glu Gly Arg Met Lys Phe Ser
        290                 295                 300 gtc tcc gcc gcc gtc ctc gcc ttc gcc gcc tcc gtc gcc gcc ctc cct      960
Val Ser Ala Ala Val Leu Ala Phe Ala Ala Ser Val Ala Ala Leu Pro
305                 310                 315                 320 cag cac gac tcc gcc gcc ggc aac ggc aac ggc gtc ggc aac aag ttc     1008
Gln His Asp Ser Ala Ala Gly Asn Gly Asn Gly Val Gly Asn Lys Phe
                325                 330                 335 cct gtc cct gac gac gtc acc gtc aag cag gcc acc gac aag tgc ggc     1056
Pro Val Pro Asp Asp Val Thr Val Lys Gln Ala Thr Asp Lys Cys Gly
                340                 345                 350 gac cag gcc cag ctc tcc tgc tgc aac aag gcc acc tac gcc ggc gac     1104
Asp Gln Ala Gln Leu Ser Cys Cys Asn Lys Ala Thr Tyr Ala Gly Asp
            355                 360                 365 gtc ctc acc gac atc gac gag ggc atc ctc gcc ggc ctc ctc aag aac     1152
Val Leu Thr Asp Ile Asp Glu Gly Ile Leu Ala Gly Leu Leu Lys Asn
370                 375                 380 ctc atc ggc ggc ggc tcc ggc tcc gag ggc ctc ggc ctc ttc gac cag     1200
Leu Ile Gly Gly Gly Ser Gly Ser Glu Gly Leu Gly Leu Phe Asp Gln
385                 390                 395                 400 tgc gtc aag ctc gac ctc cag atc tcc gtc atc ggc atc cct atc cag     1248
Cys Val Lys Leu Asp Leu Gln Ile Ser Val Ile Gly Ile Pro Ile Gln
                405                 410                 415 gac ctc ctc aac cag gtc aac aag cag tgc aag cag aac atc gcc tgc     1296
Asp Leu Leu Asn Gln Val Asn Lys Gln Cys Lys Gln Asn Ile Ala Cys
                420                 425                 430 tgc cag aac tcc cct tcc gac gcc acc ggc tcc ctc gtc aac ctc ggc     1344
Cys Gln Asn Ser Pro Ser Asp Ala Thr Gly Ser Leu Val Asn Leu Gly
            435                 440                 445 ctc ggc aac cct tgc atc cct gtc tcc ctc ctc cat atg gga tct cat     1392
Leu Gly Asn Pro Cys Ile Pro Val Ser Leu Leu His Met Gly Ser His
        450                 455                 460 cac cat cac cat cac                                                  1407
His His His His His
465

<210> SEQ ID NO 24
<211> LENGTH: 469
<212> TYPE: PRT
<213> ORGANISM: Artificial Sequence
<220> FEATURE:
<223> OTHER INFORMATION: basf-yaad-Xa-BASF1-his: fusion of Bacillus
      subtilis yaaD and N-terminal factor Xa proteinase cleavage site
      and artificial hydrophobin BASF1; BASF1 from chemically
      synthesized polynucleotide

<400> SEQUENCE: 24

Met Ala Gln Thr Gly Thr Glu Arg Val Lys Arg Gly Met Ala Glu Met
1               5                   10                  15

Gln Lys Gly Gly Val Ile Met Asp Val Ile Asn Ala Glu Gln Ala Lys
```

-continued

```
            20                  25                  30
Ile Ala Glu Glu Ala Gly Ala Val Ala Val Met Ala Leu Glu Arg Val
         35                  40                  45
Pro Ala Asp Ile Arg Ala Ala Gly Gly Val Ala Arg Met Ala Asp Pro
     50                  55                  60
Thr Ile Val Glu Glu Val Met Asn Ala Val Ser Ile Pro Val Met Ala
 65                  70                  75                  80
Lys Ala Arg Ile Gly His Ile Val Glu Ala Arg Val Leu Glu Ala Met
                 85                  90                  95
Gly Val Asp Tyr Ile Asp Glu Ser Glu Val Leu Thr Pro Ala Asp Glu
                100                 105                 110
Glu Phe His Leu Asn Lys Asn Glu Tyr Thr Val Pro Phe Val Cys Gly
             115                 120                 125
Cys Arg Asp Leu Gly Glu Ala Thr Arg Arg Ile Ala Glu Gly Ala Ser
         130                 135                 140
Met Leu Arg Thr Lys Gly Glu Pro Gly Thr Gly Asn Ile Val Glu Ala
145                 150                 155                 160
Val Arg His Met Arg Lys Val Asn Ala Gln Val Arg Lys Val Val Ala
                165                 170                 175
Met Ser Glu Asp Glu Leu Met Thr Glu Ala Lys Asn Leu Gly Ala Pro
             180                 185                 190
Tyr Glu Leu Leu Leu Gln Ile Lys Lys Asp Gly Lys Leu Pro Val Val
             195                 200                 205
Asn Phe Ala Ala Gly Gly Val Ala Thr Pro Ala Asp Ala Ala Leu Met
         210                 215                 220
Met Gln Leu Gly Ala Asp Gly Val Phe Val Gly Ser Gly Ile Phe Lys
225                 230                 235                 240
Ser Asp Asn Pro Ala Lys Phe Ala Lys Ala Ile Val Glu Ala Thr Thr
                245                 250                 255
His Phe Thr Asp Tyr Lys Leu Ile Ala Glu Leu Ser Lys Glu Leu Gly
             260                 265                 270
Thr Ala Met Lys Gly Ile Glu Ile Ser Asn Leu Leu Pro Glu Gln Arg
         275                 280                 285
Met Gln Glu Arg Gly Trp Arg Ser Ile Glu Gly Arg Met Lys Phe Ser
 290                 295                 300
Val Ser Ala Ala Val Leu Ala Phe Ala Ala Ser Val Ala Ala Leu Pro
305                 310                 315                 320
Gln His Asp Ser Ala Ala Gly Asn Gly Asn Gly Val Gly Asn Lys Phe
                325                 330                 335
Pro Val Pro Asp Asp Val Thr Val Lys Gln Ala Thr Asp Lys Cys Gly
             340                 345                 350
Asp Gln Ala Gln Leu Ser Cys Cys Asn Lys Ala Thr Tyr Ala Gly Asp
         355                 360                 365
Val Leu Thr Asp Ile Asp Glu Gly Ile Leu Ala Gly Leu Leu Lys Asn
     370                 375                 380
Leu Ile Gly Gly Gly Ser Gly Ser Glu Gly Leu Gly Leu Phe Asp Gln
385                 390                 395                 400
Cys Val Lys Leu Asp Leu Gln Ile Ser Val Ile Gly Ile Pro Ile Gln
                405                 410                 415
Asp Leu Leu Asn Gln Val Asn Lys Gln Cys Lys Gln Asn Ile Ala Cys
             420                 425                 430
Cys Gln Asn Ser Pro Ser Asp Ala Thr Gly Ser Leu Val Asn Leu Gly
         435                 440                 445
```

```
Leu Gly Asn Pro Cys Ile Pro Val Ser Leu Leu His Met Gly Ser His
        450                 455                 460

His His His His His
465
```

<210> SEQ ID NO 25
<211> LENGTH: 561
<212> TYPE: DNA
<213> ORGANISM: Artificial sequence
<220> FEATURE:
<221> NAME/KEY: CDS
<222> LOCATION: (1)..(561)
<223> OTHER INFORMATION: DNA sequence encoding fusion protein
      yaad40-Xa-dewA-his

<400> SEQUENCE: 25

```
atg gct caa aca ggt act gaa cgt gta aaa cgc gga atg gca gaa atg        48
Met Ala Gln Thr Gly Thr Glu Arg Val Lys Arg Gly Met Ala Glu Met
1               5                   10                  15 caa aaa ggc ggc gtc atc atg gac gtc atc aat gcg gaa caa gcg aaa        96
Gln Lys Gly Gly Val Ile Met Asp Val Ile Asn Ala Glu Gln Ala Lys
            20                  25                  30 atc gct gaa gaa gct gga gct gtc att gaa ggc cgc atg cgc ttc atc       144
Ile Ala Glu Glu Ala Gly Ala Val Ile Glu Gly Arg Met Arg Phe Ile
        35                  40                  45 gtc tct ctc ctc gcc ttc act gcc gcg gcc acc gcg acc gcc ctc ccg       192
Val Ser Leu Leu Ala Phe Thr Ala Ala Ala Thr Ala Thr Ala Leu Pro
    50                  55                  60 gcc tct gcc gca aag aac gcg aag ctg gcc acc tcg gcg gcc ttc gcc       240
Ala Ser Ala Ala Lys Asn Ala Lys Leu Ala Thr Ser Ala Ala Phe Ala
65                  70                  75                  80 aag cag gct gaa ggc acc acc tgc aat gtc ggc tcg atc gct tgc tgc       288
Lys Gln Ala Glu Gly Thr Thr Cys Asn Val Gly Ser Ile Ala Cys Cys
                85                  90                  95 aac tcc ccc gct gag acc aac aac gac agt ctg ttg agc ggt ctg ctc       336
Asn Ser Pro Ala Glu Thr Asn Asn Asp Ser Leu Leu Ser Gly Leu Leu
            100                 105                 110 ggt gct ggc ctt ctc aac ggg ctc tcg ggc aac act ggc agc gcc tgc       384
Gly Ala Gly Leu Leu Asn Gly Leu Ser Gly Asn Thr Gly Ser Ala Cys
        115                 120                 125 gcc aag gcg agc ttg att gac cag ctg ggt ctg ctc gct ctc gtc gac       432
Ala Lys Ala Ser Leu Ile Asp Gln Leu Gly Leu Leu Ala Leu Val Asp
    130                 135                 140 cac act gag gaa ggc ccc gtc tgc aag aac atc gtc gct tgc tgc cct       480
His Thr Glu Glu Gly Pro Val Cys Lys Asn Ile Val Ala Cys Cys Pro
145                 150                 155                 160 gag gga acc acc aac tgt gtt gcc gtc gac aac gct ggc gct ggt acc       528
Glu Gly Thr Thr Asn Cys Val Ala Val Asp Asn Ala Gly Ala Gly Thr
                165                 170                 175 aag gct gag gga tct cat cac cat cac cat cac                           561
Lys Ala Glu Gly Ser His His His His His His
            180                 185
```

<210> SEQ ID NO 26
<211> LENGTH: 187
<212> TYPE: PRT
<213> ORGANISM: artificial sequence
<220> FEATURE:
<223> OTHER INFORMATION: fusion protein yaad40-Xa-dewA-his

<400> SEQUENCE: 26

```
Met Ala Gln Thr Gly Thr Glu Arg Val Lys Arg Gly Met Ala Glu Met
1               5                   10                  15
```

```
Gln Lys Gly Gly Val Ile Met Asp Val Ile Asn Ala Glu Gln Ala Lys
             20                  25                  30
Ile Ala Glu Glu Ala Gly Ala Val Ile Glu Gly Arg Met Arg Phe Ile
         35                  40                  45
Val Ser Leu Leu Ala Phe Thr Ala Ala Thr Ala Thr Ala Leu Pro
 50                  55                  60
Ala Ser Ala Ala Lys Asn Ala Lys Leu Ala Thr Ser Ala Ala Phe Ala
 65                  70                  75                  80
Lys Gln Ala Glu Gly Thr Thr Cys Asn Val Gly Ser Ile Ala Cys Cys
                 85                  90                  95
Asn Ser Pro Ala Glu Thr Asn Asn Asp Ser Leu Leu Ser Gly Leu Leu
                100                 105                 110
Gly Ala Gly Leu Leu Asn Gly Leu Ser Gly Asn Thr Gly Ser Ala Cys
                115                 120                 125
Ala Lys Ala Ser Leu Ile Asp Gln Leu Gly Leu Leu Ala Leu Val Asp
            130                 135                 140
His Thr Glu Glu Gly Pro Val Cys Lys Asn Ile Val Ala Cys Cys Pro
145                 150                 155                 160
Glu Gly Thr Thr Asn Cys Val Ala Val Asp Asn Ala Gly Ala Gly Thr
                165                 170                 175
Lys Ala Glu Gly Ser His His His His His His
            180                 185

<210> SEQ ID NO 27
<211> LENGTH: 28
<212> TYPE: DNA
<213> ORGANISM: Artificial Sequence
<220> FEATURE:
<223> OTHER INFORMATION: Chemically synthesized Hal570 primer

<400> SEQUENCE: 27
gcgcgcccat ggctcaaaca ggtactga                                        28

<210> SEQ ID NO 28
<211> LENGTH: 28
<212> TYPE: DNA
<213> ORGANISM: Artificial Sequence
<220> FEATURE:
<223> OTHER INFORMATION: Chemically synthesized Hal571 primer

<400> SEQUENCE: 28
gcagatctcc agccgcgttc ttgcatac                                        28

<210> SEQ ID NO 29
<211> LENGTH: 30
<212> TYPE: DNA
<213> ORGANISM: Artificial Sequence
<220> FEATURE:
<223> OTHER INFORMATION: Chemically synthesized Hal572 primer

<400> SEQUENCE: 29
ggccatggga ttaacaatag gtgtactagg                                      30

<210> SEQ ID NO 30
<211> LENGTH: 33
<212> TYPE: DNA
<213> ORGANISM: Artificial Sequence
<220> FEATURE:
<223> OTHER INFORMATION: Chemically synthesized Hal573 primer

<400> SEQUENCE: 30
gcagatctta caagtgccctt ttgcttatat tcc                                 33
```

```
<210> SEQ ID NO 31
<211> LENGTH: 38
<212> TYPE: DNA
<213> ORGANISM: Artificial Sequence
<220> FEATURE:
<223> OTHER INFORMATION: Chemically synthesized KaM416 primer

<400> SEQUENCE: 31
gcagcccatc agggatccct cagccttggt accagcgc                              38

<210> SEQ ID NO 32
<211> LENGTH: 50
<212> TYPE: DNA
<213> ORGANISM: Artificial Sequence
<220> FEATURE:
<223> OTHER INFORMATION: Chemically synthesized KaM417 primer

<400> SEQUENCE: 32
cccgtagcta gtggatccat tgaaggccgc atgaagttct ccgtctccgc                 50

<210> SEQ ID NO 33
<211> LENGTH: 45
<212> TYPE: DNA
<213> ORGANISM: Artificial Sequence
<220> FEATURE:
<223> OTHER INFORMATION: Chemically synthesized KaM434 primer

<400> SEQUENCE: 33
gctaagcgga tccattgaag gccgcatgaa gttctccatt gctgc                      45

<210> SEQ ID NO 34
<211> LENGTH: 30
<212> TYPE: DNA
<213> ORGANISM: Artificial Sequence
<220> FEATURE:
<223> OTHER INFORMATION: Chemically synthesized KaM435 primer

<400> SEQUENCE: 34
ccaatgggga tccgaggatg gagccaaggg                                       30

<210> SEQ ID NO 35
<211> LENGTH: 38
<212> TYPE: DNA
<213> ORGANISM: Artificial Sequence
<220> FEATURE:
<223> OTHER INFORMATION: Chemically synthesized KaM418 primer

<400> SEQUENCE: 35
ctgccattca ggggatccca tatggaggag ggagacag                              38

<210> SEQ ID NO 36
<211> LENGTH: 32
<212> TYPE: DNA
<213> ORGANISM: Artificial Sequence
<220> FEATURE:
<223> OTHER INFORMATION: Chemically synthesized KaM464 primer

<400> SEQUENCE: 36
cgttaaggat ccgaggatgt tgatgggggt gc                                    32

<210> SEQ ID NO 37
<211> LENGTH: 35
<212> TYPE: DNA
<213> ORGANISM: Artificial Sequence
<220> FEATURE:
<223> OTHER INFORMATION: Chemically synthesized KaM465 primer
```

```
<400> SEQUENCE: 37
gctaacagat ctatgttcgc ccgtctcccc gtcgt                              35
```